(12) United States Patent
Scarcelli et al.

(10) Patent No.: US 12,158,373 B2
(45) Date of Patent: Dec. 3, 2024

(54) BRILLOUIN IMAGING DEVICES, AND SYSTEMS AND METHODS EMPLOYING SUCH DEVICES PRELIMINARY CLASS

(71) Applicant: UNIVERSITY OF MARYLAND, COLLEGE PARK, College Park, MD (US)

(72) Inventors: Giuliano Scarcelli, Washington, DC (US); Jitao Zhang, College Park, MD (US); Milos Nikolic, College Park, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 209 days.

(21) Appl. No.: 17/864,196

(22) Filed: Jul. 13, 2022

(65) Prior Publication Data

US 2022/0349754 A1    Nov. 3, 2022

Related U.S. Application Data

(62) Division of application No. 16/760,055, filed as application No. PCT/US2018/058130 on Oct. 30, 2018, now Pat. No. 11,408,770.

(Continued)

(51) Int. Cl.
*G01J 3/44*    (2006.01)
*G01J 3/02*    (2006.01)
(Continued)

(52) U.S. Cl.
CPC ............ *G01J 3/4412* (2013.01); *G01J 3/021* (2013.01); *G01J 3/0248* (2013.01); *G01J 3/027* (2013.01);

(Continued)

(58) Field of Classification Search
CPC ........ G01J 3/4412; G01J 3/021; G01J 3/0248; G01J 3/027; G01J 3/26; G01J 3/0289;
(Continued)

(56) References Cited

U.S. PATENT DOCUMENTS 5,162,941 A    11/1992    Favro et al.
7,872,759 B2    1/2011    Tearney et al.
(Continued)

FOREIGN PATENT DOCUMENTS

WO    2008/137637 A2    11/2008
WO    2016/081731 A1    5/2016
WO    2018/140602 A1    8/2018

OTHER PUBLICATIONS

Zhang, Jitao, et al. "Line-scanning Brillouin microscopy for rapid non-invasive mechanical imaging." Scientific reports 6.1 (2016): 35398. (Year: 2016).*

(Continued)

*Primary Examiner* — Dominic J Bologna
(74) *Attorney, Agent, or Firm* — Rowan Tree Law Group, PLLC; Frederick F. Rosenberger

(57) ABSTRACT

A Brillouin modality can be supplemented by an auxiliary modality, such as an optical imaging modality or a spectroscopy modality. In some embodiments, the auxiliary modality can be used to guide the Brillouin measurement to a desired region of interest, so that acquisition times for the Brillouin measurement can be reduced as compared to interrogating the entire sample. The auxiliary modality may have an acquisition speed faster than that of the Brillouin modality. In some embodiment, the auxiliary modality determines a composition of materials within a voxel in the sample interrogated by the Brillouin modality. Using the information provided by the auxiliary modality, the Brillouin signatures corresponding to the materials within the (Continued)

voxel can be unmixed, thereby providing a more accurate measurement of the sample.

19 Claims, 11 Drawing Sheets

Related U.S. Application Data

(60) Provisional application No. 62/578,932, filed on Oct. 30, 2017.

(51) Int. Cl.
| | |
|---|---|
| *G01J 3/26* | (2006.01) |
| *G01N 21/35* | (2014.01) |
| *G01N 21/359* | (2014.01) |
| *G01N 21/64* | (2006.01) |
| *G01N 21/65* | (2006.01) |
| *G02B 21/00* | (2006.01) |
| *G02B 21/08* | (2006.01) |

(52) U.S. Cl.
CPC ............. *G01J 3/26* (2013.01); *G01N 21/359* (2013.01); *G01N 21/6458* (2013.01); *G01N 21/65* (2013.01); *G02B 21/0088* (2013.01); *G02B 21/0096* (2013.01); *G02B 21/082* (2013.01); *G01N 2021/3595* (2013.01); *G01N 2021/655* (2013.01)

(58) Field of Classification Search
CPC .. G01N 21/359; G01N 21/6458; G01N 21/65; G01N 2021/3595; G01N 2021/655; G02B 21/0088; G02B 21/0096; G02B 21/082
See application file for complete search history.

(56) References Cited

U.S. PATENT DOCUMENTS

| | | | |
|---|---|---|---|
| 9,557,154 B2* | 1/2017 | Tearney | A61B 5/0071 |
| 2009/0323056 A1* | 12/2009 | Yun | G01J 3/26 |
| | | | 356/326 |
| 2012/0302862 A1 | 11/2012 | Yun et al. | |
| 2014/0118722 A1* | 5/2014 | Treado | G02B 21/16 |
| | | | 356/51 |
| 2014/0368792 A1 | 12/2014 | Friedman et al. | |
| 2016/0151202 A1* | 6/2016 | Scarcelli | A61F 9/008 |
| | | | 606/5 |
| 2016/0206194 A1* | 7/2016 | Vogler | G02B 27/141 |
| 2017/0176318 A1* | 6/2017 | Scarcelli | G01N 15/1434 |
| 2017/0254749 A1* | 9/2017 | Yun | A61B 5/0095 |

OTHER PUBLICATIONS

Antonacci et al., "Biomechanics of subcellular structures by noninvasive Brillouin microscopy," *Scientific Reports*, Nov. 2016, 6:37217. (7 pages).

Elsayad et al., "Mapping the subcellular mechanical properties of live cells in tissues with fluorescence emission-Brillouin imaging," *Science Signaling*, Jul. 2016, 9(435): rs5. (25 pages).

International Search Report and Written Opinion, mailed Feb. 19, 2019, in International Application No. PCT/US2018/058130. (17 pages).

Mattana et al., "Non-contact mechanical and chemical analysis of single living cells by microspectroscopic techniques," *Light: Science & Applications*, Feb. 2018 (preview published online Oct. 12, 2017), 7:17139. (9 pages).

Notice of Allowance, issued Dec. 13, 2021 (Dec. 13, 2021), in U.S. Appl. No. 16/760,055. (9 pages).

Notice of Allowance, issued Apr. 15, 2022 (Apr. 15, 2022), in U.S. Appl. No. 16/760,055. (9 pages).

Office Action, issued Feb. 16, 2021 (Feb. 16, 2021), in U.S. Appl. No. 16/760,055. (8 pages).

Office Action, issued May 14, 2021 (May 14, 2021), in U.S. Appl. No. 16/760,055. (15 pages).

Office Action, issued Aug. 27, 2021 (Aug. 27, 2021), in European Application No. 18873399.2. (10 pages).

Raghunathan et al., "Evaluating biomechanical properties of murine embryos using Brillouin microscopy and optical coherence tomography," *Journal of Biomedical Optics*, Aug. 2017, 22(8):086013. (7 pages).

Scarcelli et al., "Noncontact three-dimensional mapping of intracellular hydro-mechanical properties by Brillouin microscopy," *Nature Methods*, Oct. 2015, 12: pp. 1132-1134. (12 pages).

Zhang et al., "Line-scanning Brillouin microscopy for rapid noninvasive mechanical imaging," *Scientific Reports*, 2016, 6:35398. (8 pages).

Zhang et al., "Brillouin flow cytometry for label-free mechanical phenotyping of the nucleus," *Lab Chip*, Feb. 2017, 17(4): pp. 663-670. (16 pages).

\* cited by examiner

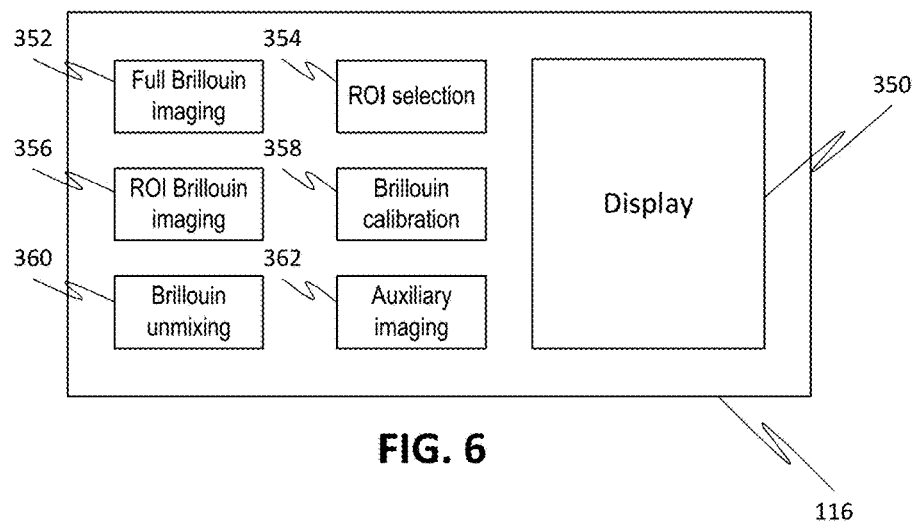
FIG. 6
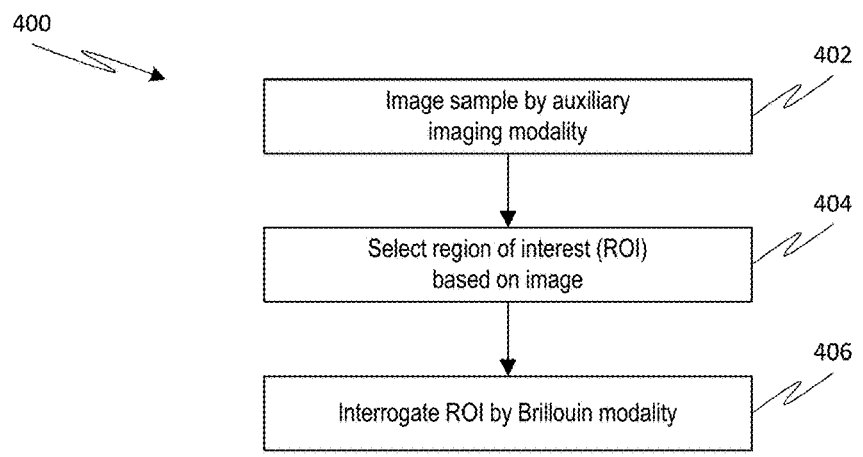
FIG. 7
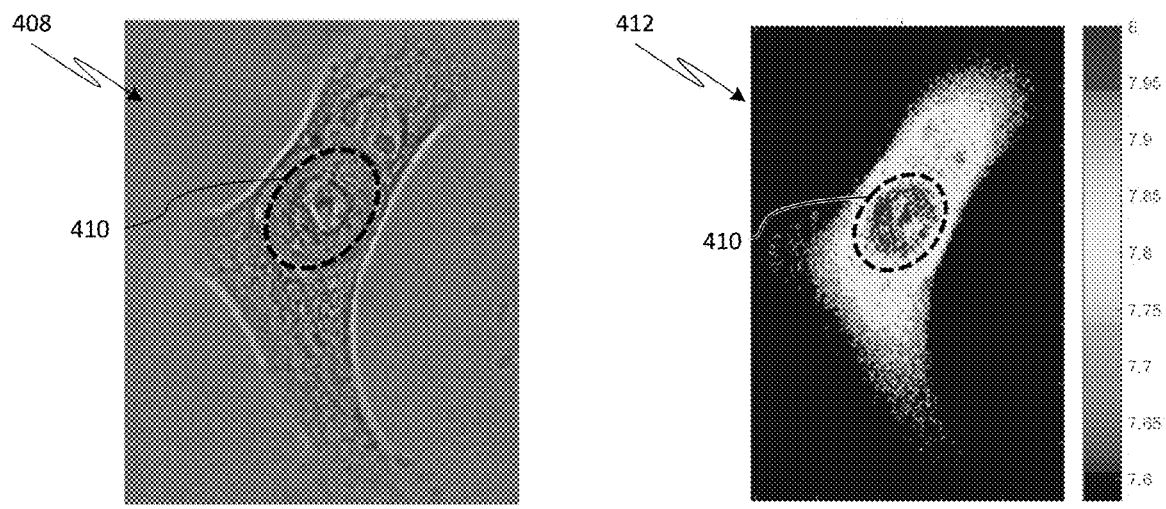
FIG. 8A
FIG. 8B

BRILLOUIN IMAGING DEVICES, AND SYSTEMS AND METHODS EMPLOYING SUCH DEVICES PRELIMINARY CLASS

CROSS-REFERENCE TO RELATED APPLICATIONS

The present application claims the benefit of U.S. Provisional Application No. 62/578,932, filed Oct. 30, 2017, which is hereby incorporated by reference herein in its entirety.

FIELD

The present disclosure relates generally to obtaining information about a sample based on Brillouin light scattering, and more particularly, to Brillouin measurements supplemented by auxiliary modalities.

BACKGROUND

Brillouin light scattering, which arises from the interaction of light with acoustic phonons within a material, can be used to measure and/or image the mechanical properties of a sample (e.g., a biological sample, such as a cell, tissue, or organ). Light from an interrogating light source is incident on and scattered by the sample. Because of the photon-phonon interaction, the scattered light undergoes a ~GHz frequency shift proportional to the local longitudinal elastic modulus. By measuring the characteristics of the scattered light (e.g., magnitude, frequency shift, and/or linewidth) with a Brillouin spectrometer, at least one of the elastic modulus or stiffness (i.e., resistance to deformation in response to applied force), viscosity (i.e., a measure of a fluid's resistance to flow), electrostriction (i.e., change in shape due to application of an electric field), and mass density of the sample material can be acquired in a non-contact and non-invasive manner.

However, current Brillouin techniques may have shortcomings that render it unsuitable for certain applications. For example, Brillouin microscopy is considered to be a relatively slow technique as compared to other imaging modalities. Because the optical signal of Brillouin scattering is weak, relatively long exposure times (e.g., typically 10-100 ms per pixel, although 0.1 ms per pixel may be possible in some configurations) are necessary in order for the Brillouin spectrometer to acquire a signal with sufficient signal-to-noise ratio at each measurement point (i.e., pixel). Moreover, to obtain an image of a sample, Brillouin microscopy must carry out a point-by-point scan, which could be impractical for living biological samples that may change or move over time. For example, to obtain a full 3D image with micron-scale resolution of a biological cell, a map of a cube of 100×100×20 points (i.e., 200,000 separate measurement points) may be necessary. Such data acquisition with conventional Brillouin systems could take on the order of hours to complete. For larger samples, such as tissues or organs, the required number of measurement points, and thus the corresponding acquisition times, may be substantially larger.

In addition, the signal collected and analyzed by the Brillouin spectrometer is sampled via a microscope objective lens that gathers all the backscattered light from the materials within a voxel (e.g., on the order of $\mu m^3$) of the focused beam spot. When the sample within the voxel is substantially homogeneous, the Brillouin signal represents a true mechanical phenotype of the material. However, most biological samples are not homogeneous; rather, they contain highly heterogeneous constituent materials, even on a submicron scale. In such a scenario, the measurement returned by the Brillouin spectrometer will be an average value of all materials contained within that voxel. As the materials within the voxel may have significantly different properties, the resulting Brillouin measurement may not actually correspond to the structure intended to be measured. For example, the thickness of the cell cortex, which is an actin-rich network and regulates the overall mechanical properties and activities of the cell, is usually less than 0.2 µm. Therefore, the majority of the voxel analyzed by a Brillouin microscope in the cortex region is often occupied by surrounding aqueous solution. As a result, instead of appearing as a stiff portion of the cell, the cortex region appears as relatively soft due to the dominating aqueous artefact.

Moreover, for Brillouin measurements taken over an extended period of time (or at different times), the accuracy of the measured spectrum may degrade due to frequency drift of the laser source and/or mechanical drift of the instrument components. Such degradation during or between Brillouin measurements could introduce considerable errors or artefacts.

Embodiments of the disclosed subject matter may address one or more of the above-noted problems and disadvantages, among other things.

SUMMARY

Embodiments of the disclosed subject matter can obtain information about a sample using Brillouin light scattering (i.e., a Brillouin imaging modality) supplemented by an auxiliary imaging modality (i.e., an optical imaging modality or a spectroscopy modality). In particular, the auxiliary imaging modality can be used to guide the Brillouin imaging modality to a desired region of interest, so that Brillouin measurement acquisition times can be reduced as compared to imaging the entire sample. In such configurations, the auxiliary imaging modality may have an acquisition speed faster than that of the Brillouin imaging modality.

Alternatively or additionally, the auxiliary imaging modality can be used to determine a composition of materials within a voxel in the sample interrogated by the Brillouin imaging modality. Using the information provided by the auxiliary imaging modality, the corresponding Brillouin signatures of the materials within the voxel can be unmixed, thereby providing a more accurate measurement of the constituent materials of the sample.

In some embodiments, the Brillouin imaging modality can be constructed as an add-on module compatible with existing microscope setups that include the auxiliary imaging modality. The Brillouin imaging modality can be provided with a calibration module that allows for in situ measurement of standard samples for correction of frequency or mechanical drift, which would otherwise lead to measurement errors.

In one or more embodiments, a system comprises a microscope and a control unit. The microscope has a first imaging modality and a Brillouin imaging (i.e., Brillouin light scattering) modality. The control unit is operatively coupled to the first imaging and the Brillouin imaging modalities. The control unit is also configured to generate at least a spatially-resolved Brillouin measurement of a sample. An acquisition speed of the first imaging modality is faster than that of the Brillouin imaging modality.

In one or more embodiments, a method comprises directing first interrogating light from a first imaging modality to a sample and detecting first light from the sample using the first imaging modality. The method also comprises directing second interrogating light from a Brillouin imaging modality to the sample and detecting second light from the sample using the Brillouin imaging modality. The method further comprises generating a spatially-resolved Brillouin measurement of the sample based on the detected second light. An acquisition speed of the first imaging modality is different than that of the Brillouin imaging modality.

In one or more embodiments, a kit for modification of an existing microscope comprises a Brillouin imaging modality having an acquisition speed that is less than that of a first imaging modality of the microscope. The Brillouin imaging modality comprises a Brillouin spectrometer, a first light source, and a filter. The Brillouin spectrometer is configured to detect light from a sample. The first light source is configured to generate interrogating light having a first wavelength different from a second wavelength of a second light source of the first imaging modality. The filter is configured to prevent light having the second wavelength from reaching the Brillouin spectrometer. In one or more embodiments, a microscope system comprises a microscope with an objective and a first imaging modality, and the above-noted kit.

In one or more embodiments, a system comprises a microscope and a control unit. The microscope has a spectroscopic modality and a Brillouin imaging modality. The control unit is operatively coupled to the spectroscopic and the Brillouin imaging modalities. The control unit is configured to generate at least a spatially-resolved Brillouin measurement of a sample. The spectroscopic modality comprises near-infrared reflectance spectroscopy or Fourier-transform infrared (FTIR) spectroscopy.

Objects and advantages of embodiments of the disclosed subject matter will become apparent from the following description when considered in conjunction with the accompanying drawings.

BRIEF DESCRIPTION OF DRAWINGS

Embodiments will hereinafter be described with reference to the accompanying drawings, which have not necessarily been drawn to scale. Where applicable, some elements may be simplified or otherwise not illustrated in order to assist in the illustration and description of underlying features. For example, in some figures, the propagation of light has not been shown or has been illustrated using block arrows or lines rather than employing ray diagrams. Throughout the figures, like reference numerals denote like elements.

FIG. 6 illustrates a simplified version of a user interface for a microscope system, according to one or more embodiments of the disclosed subject matter.

FIG. 7 is an exemplary process flow diagram for obtaining a Brillouin measurement of a sample based on a region of interest defined using an auxiliary imaging modality, according to one or more embodiments of the disclosed subject matter.

FIG. 8A is an exemplary image of a sample obtained using an auxiliary imaging modality (e.g., confocal fluorescence microscopy).

FIG. 8B is an exemplary image of the sample of FIG. 8A obtained using a Brillouin imaging modality.

DETAILED DESCRIPTION

In embodiments, an auxiliary imaging modality, which is co-registered with a Brillouin imaging modality, can be used to address issues affecting the Brillouin measurement of a particular sample. For example, in some embodiments, the auxiliary imaging modality is used to image the sample to locate a region of interest for interrogation by the Brillouin imaging modality. The acquisition time for the Brillouin measurement can thus be reduced as compared to interrogating the entire sample. In some embodiments, the auxiliary imaging modality is used to determine a relative composition of a voxel (or voxels) of the Brillouin measurement. The information from the auxiliary imaging modality can be used to extract or unmix the Brillouin signatures of the constituent materials in the voxel, thereby providing a more accurate Brillouin measurement.

As used herein, auxiliary modality or auxiliary imaging modality (or first imaging modality) refers to a non-Brillouin technique for interrogating a sample that provides information about the sample different than that obtained via the Brillouin technique, and includes optical imaging modalities as well as spectroscopic modalities that may not actually generate an image of the sample. For example, the optical imaging modalities can include, but are not limited to, reflectance imaging, brightfield imaging, fluorescence imaging, multi-photon imaging, phase contrast imaging, and differential interference imaging. For example, the spectroscopic modalities can include, but are not limited to, near-infrared (NIR) reflectance spectroscopy, Fourier-transform infrared (FTIR) spectroscopy, spontaneous Raman spectroscopy, stimulated Raman spectroscopy, and frequency comb spectroscopy. As used herein, Brillouin measurement modality, Brillouin modality, or Brillouin imaging modality refers to a Brillouin light scattering technique for interrogating a sample that provides information about the mechanical properties (e.g., elastic modulus or stiffness, viscosity, electrostriction, and/or mass density) of a sample.

In some embodiments, a calibration module can be used to compensate for variations over time that may otherwise negatively affect the Brillouin measurement. For example, in some embodiments, the calibration module can be provided as part of, or otherwise separately coupled to, the Brillouin imaging modality. The calibration module can include one or more known samples (i.e., standard samples) with predetermined, stable Brillouin signatures. Periodic or on-demand interrogation of the known samples can be used to correct the spectral error associated with laser frequency drifts and/or spectrometer mechanical instabilities of the Brillouin imaging modality. The structure of the calibration module can allow for in situ Brillouin measurement, such that a sample may remain in place during and unaffected by the calibration.

Figure 1:
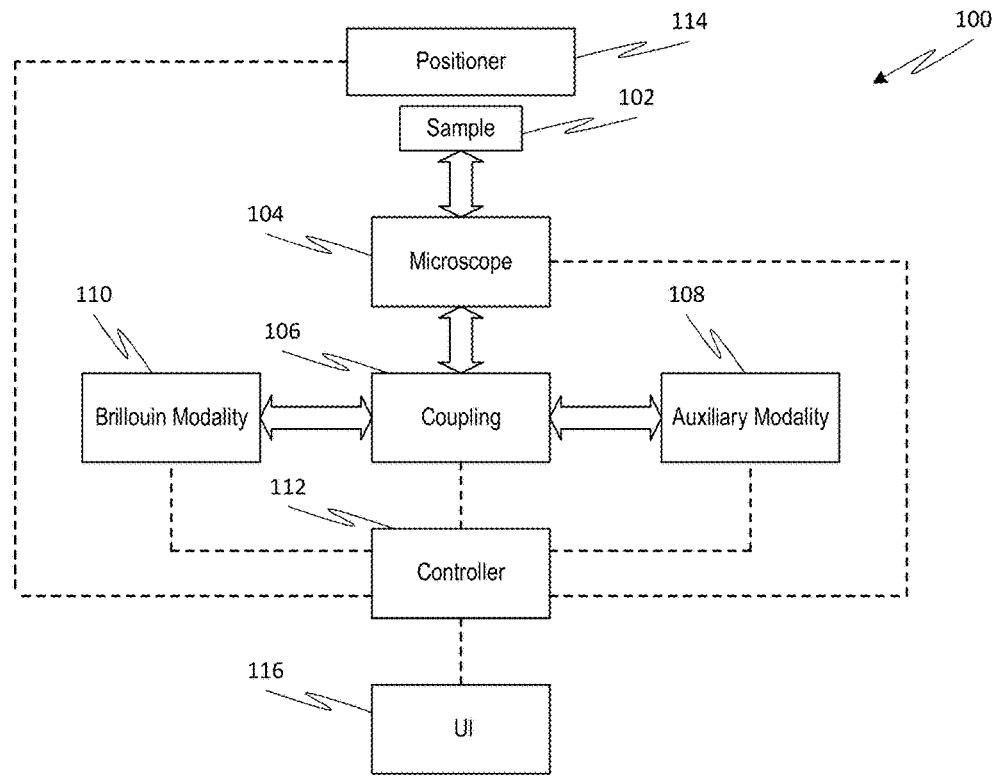
FIG. 1 is a simplified schematic diagram of a generalized optical system incorporating a Brillouin imaging modality and an auxiliary imaging modality, according to one or more embodiments of the disclosed subject matter.

Referring to FIG. 1, various aspects of a generalized optical system 100 according to embodiments of the disclosed subject matter are illustrated. The optical system 100 can be a microscope system for investigating a sample 102, for example, a biological sample such as a cell, tissue, or organ. The sample 102 can be moved relative to a focal spot of microscope optics 104 by a positioner 114 (e.g., a translation stage, which may move in one, two, or three dimensions) to allow examination of different portions of the sample by the system 100. Alternatively or additionally, the positioner 114 can be used to move the microscope optics 104 relative to the sample 102, or the positioner 114 can be replaced by beam steering components within microscope 104 that allows scanning of the focal spot relative to the sample 102.

The optical system 100 can further include an auxiliary imaging modality 108 and a Brillouin imaging modality 110, which are coupled to the same microscope optics 104 via coupling optics 106 for simultaneously or sequentially interrogating the sample 102. A control unit 112 can be operatively coupled to the different components of the optical system 100 (e.g., via wired or wireless connections) to control operation of the different modalities 108, 110, acquisition of data and corresponding processing, and/or positioning of the sample 102 for examination of different regions, among other things. A user interface 116 can be operatively coupled to the control unit 112 (e.g., via wired or wireless connections) to allow viewing of images in real-time (or substantially in real-time) or issuing of commands to control system 112.

Although components of system 100 are illustrated as separate in FIG. 1, it is contemplated that one, some, or all of the components can be integrated together into a unitary device. For example, the microscope optics 104, the coupling optics 106, and/or the auxiliary imaging modality 108 (or some components thereof) can be integrated together as an existing microscope setup, while the coupling optics 106 and/or Brillouin imaging modality 110 (or some components thereof) can be integrated together as Brillouin module that can coupled to the existing microscope setup as an add-on component.

The usage of the same microscope optics 104 by the auxiliary imaging modality 108 and Brillouin imaging modality 110 allows for automatic co-registration of their respectively acquired data, thereby allowing data from one modality to be readily correlated with data from the other modality. Alternatively, the auxiliary imaging modality 108 can employ separate microscope optics 104 (see, for example, FIG. 5C), in which case correlation or co-registration between the respectively acquired data may be necessary. In either configuration, the design of optical system 100 should prevent optical crosstalk between the different modalities, for example, by rejecting non-Brillouin light from reaching the detection spectrometer of the Brillouin modality 110. Additional considerations for the design of the optical system 100 are discussed in further detail below.

As referenced above, the data from the auxiliary imaging modality 108 can be used to supplement the Brillouin imaging modality 110 to certain advantage. For example, the auxiliary imaging modality can provide information about the sample 102 different than that of the Brillouin imaging modality 110. In particular, the Brillouin modality 110 can provide unique biophysical-information and/or mechanical properties, while auxiliary modalities 108 can provide structural and/or chemical information of sample 102.

In addition, since the auxiliary modality 108 has a different data acquisition speed from the Brillouin modality 110, the auxiliary modality 108 can serve as an image-guiding instrument. For example, the auxiliary modality 108 can have a data acquisition speed that is at least 2× faster (e.g., 10×, 20×, 50×, or even greater than 100× faster) than that of the Brillouin modality 110. For example, the Brillouin modality 110 may have a data acquisition speed on the order of 10-100 ms per pixel (but generally no better than 0.1 ms per pixel), while the auxiliary imaging modality 108 has a data acquisition speed less than 0.1 ms per pixel.

Moreover, since the auxiliary modality 108 can provide structural images with higher detail and resolution than Brillouin modality 110, data from the auxiliary modality 108 can be used for accurate spectral unmixing. For example, the auxiliary modality 108 may have a resolution between 2× to 10× better than that of the Brillouin modality 110, which has a resolution, e.g., on the order of microns to tens of microns). For example, the auxiliary modality 108 may have a sub-micron resolution, while the Brillouin modality 110 may have a resolution around one micron (e.g., a focused spot size of 0.5-10 microns).

The combination of the Brillouin measurement modality 110 with the auxiliary imaging modality 108 can be realized in many different configurations, a sample of which are discussed in further detail below. However, embodiments of the disclosed subject matter are not limited to those configurations specifically described herein. Rather, other configurations for combining Brillouin and auxiliary modalities are also possible according to one or more contemplated embodiments.

Figure 2A:
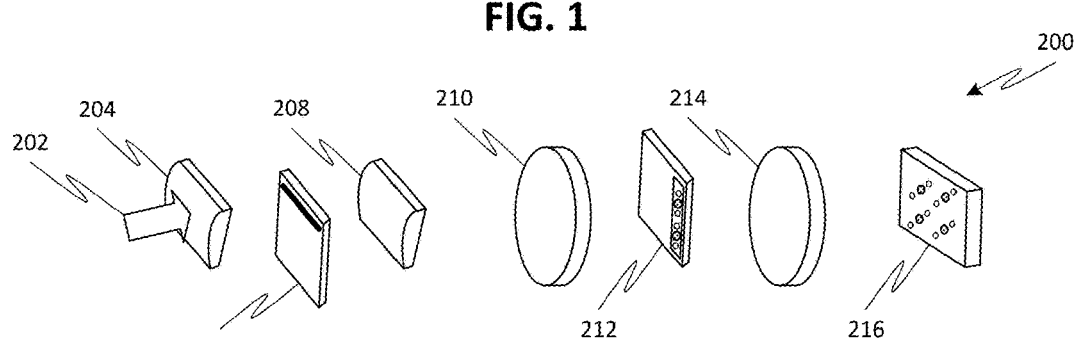
FIG. 2A illustrates an exemplary configuration for a double-stage virtually imaged phase array (VIPA) Brillouin light scattering spectrometer, according to one or more embodiments of the disclosed subject matter.
Figure 2B:
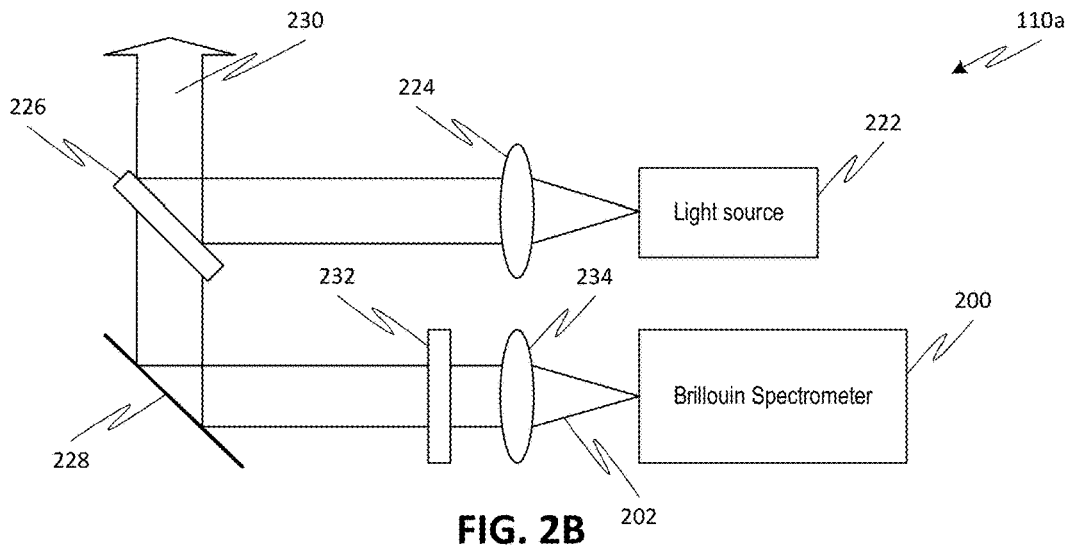
FIG. 2B illustrates a first exemplary configuration for a Brillouin imaging modality, according to one or more embodiments of the disclosed subject matter.

For example, a first exemplary configuration 110a for a Brillouin imaging modality is illustrated in FIG. 2B. In configuration 110a, a collimated light beam is generated by a collimating lens 224 set in front of a first light source 222 (e.g., a laser source, such as a linearly polarized continuous-wave laser). A beam splitter 226 can reflect a portion of the collimated light beam to form an interrogating light beam 230 to be incident on a sample 102. The interrogating light beam 230 is Brillouin scattered by the sample 102, and the backward Brillouin scattered light is collected by the microscope optics and directed to beam splitter 226 along the same optical path. A portion of the Brillouin scattered light passes through beam splitter 226 and is directed to a Brillouin spectrometer 200 via reflecting element 228 (e.g., mirror) and coupling lens 234.

A narrowband filter 232 can be disposed along the optical path between the Brillouin spectrometer 200 and the sample in order to reject non-Brillouin light, e.g., light from a second light source of the auxiliary imaging modality 108 that happens to leak through to the Brillouin modality. For example, the narrowband filter 232 can have a passband of 5 nm, centered on the wavelength of the Brillouin light source 222. The narrowband filter 232 can be disposed between the reflecting element 228 and the coupling lens 234 as illustrated in FIG. 2B. Alternatively or additionally, the narrowband filter 232 can be disposed between the beam splitter 226 and the reflecting element 228 or between the beam splitter 226 and the sample 102.

The Brillouin spectrometer 200 may process the Brillouin scattered light and detect the corresponding Brillouin signature of the interrogated portion of the sample 102. The Brillouin spectrometer 200 may have a conventional configuration, for example, as described in "Noncontact three-dimensional mapping of intracellular hydro-mechanical properties by Brillouin microscopy," *Nature Methods*, December 2015, 12 (12): pp. 1132-34, which is hereby incorporated by reference herein.

Alternatively or additionally, the Brillouin spectrometer 200 can be a double-stage virtually-imaged phase array (VIPA) Brillouin light scattering spectrometer, as illustrated in FIG. 2A. The spectrometer 200 can include a first cylindrical lens 204, which receives light 202 from the sample 102 (via beam splitter 226, reflecting element 228, and collimating lens 234). A first VIPA etalon 206 can be disposed at the focal plane of the first cylindrical lens 204. A second cylindrical lens 208 can be disposed behind the first VIPA etalon 206, at a distance equal to the focal length of the second cylindrical lens 208. A first VIPA pattern is thus present at a focal plane of the second cylindrical lens 208. The first VIPA pattern is then imaged via a 4-f imaging system and through a second VIPA etalon 212 onto a second focal plane (of a second spherical lens 214). The 4-f imaging system can include a first spherical lens 210 and a second spherical lens 214, with the first spherical lens 210 spaced from the focal plane of lens 208 based on its focal length. The second VIPA etalon 212 can be spaced from the first spherical lens 210 and from the second spherical lens 214 based on their respective focal lengths. In each stage of the spectrometer 200, the VIPA etalon 206, 212 produces a spectrally dispersed pattern in the focal planes of the respective lenses 208, 214 placed just after the etalons. The spectrally dispersed pattern is the Fourier transform of the electromagnetic field at the output of each VIPA. In a double-stage VIPA spectrometer, the two spectral dispersion stages are cascaded orthogonally to each other and the planes of the respective spectrally dispersed patterns are conjugated. The image of the spectrally dispersed pattern is projected onto detector 216 (e.g., CCD camera).

Figure 2C:
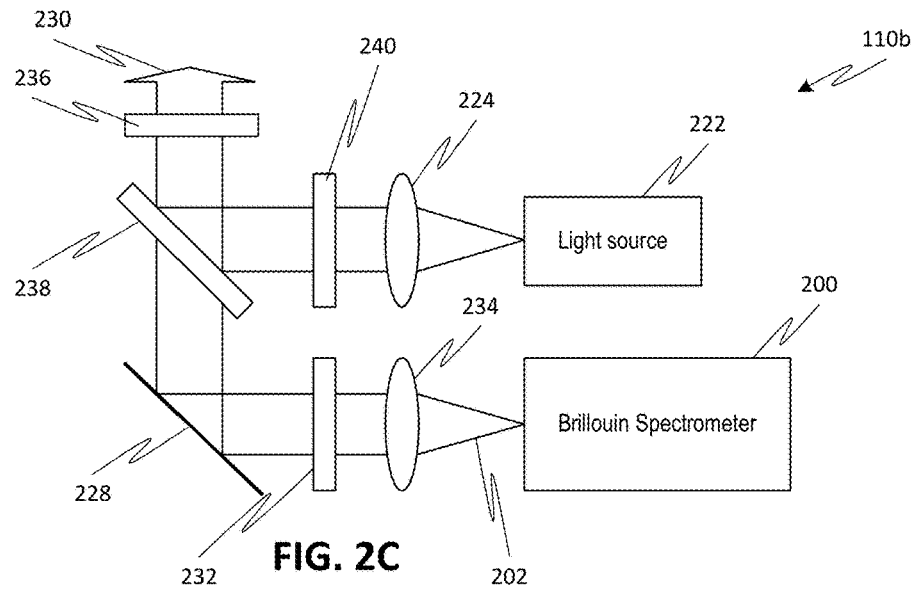
FIG. 2C illustrates a second exemplary configuration for a Brillouin imaging modality, according to one or more embodiments of the disclosed subject matter.

In an alternative configuration 110b, the beam splitter 226 can be replaced by a polarizing beam splitter 238, for example, as illustrated in FIG. 2C. Similar to the configuration of FIG. 2B, the collimated light beam is generated by collimating lens 224 set in front of first light source 222. However, the collimated light beam may then pass through a polarizer 240 (e.g., a linear polarizer), thereby resulting in a polarized light beam that is then reflected by polarized beam splitter 238 toward the sample 102. The reflected light from polarized beam splitter 238 can pass through a quarter-wave plate 236 to form the interrogating light beam 230. Light from the sample 102 is collected by the microscope optics and passes through the quarter-wave plate 236, such that the polarization of the collected light allows it to pass through polarized beam splitter 238 en route to the Brillouin spectrometer 200. Operation of the configuration of FIG. 2C is otherwise substantially similar to the configuration of FIG. 2B.

Figure 2D:
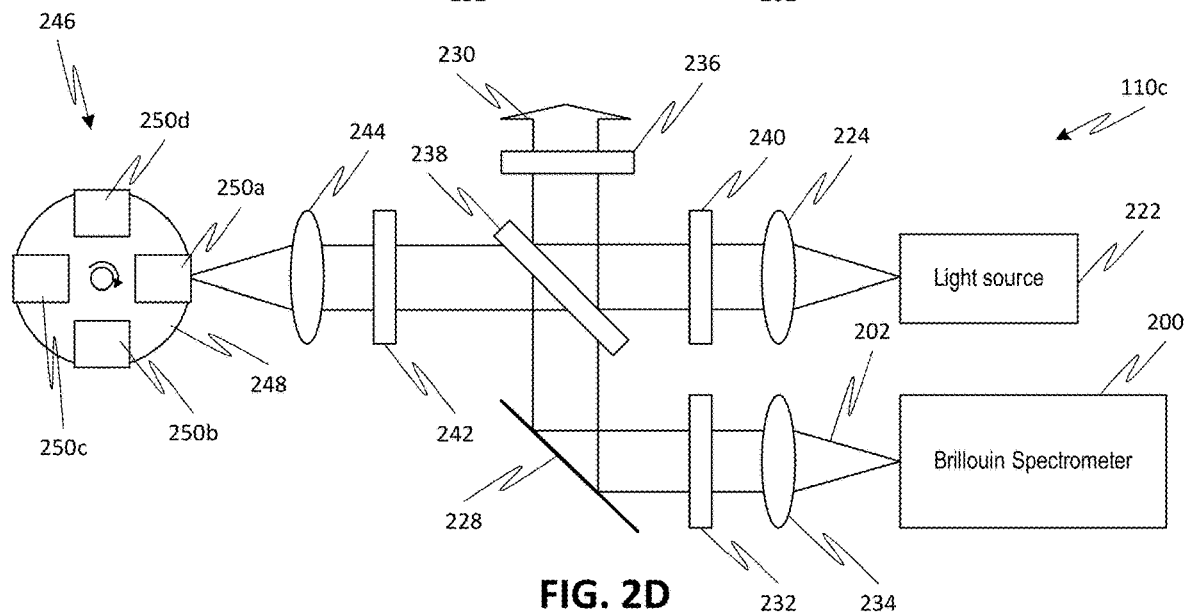
FIG. 2D illustrates a third exemplary configuration for a Brillouin imaging modality with calibration module, according to one or more embodiments of the disclosed subject matter.

The configuration of FIG. 2C may be especially useful in embodiments where calibration of the Brillouin modality is desired. For example, FIG. 2D illustrates such a configuration 110c including an in-situ calibration module 246. Similar to the configuration of FIG. 2C, the collimated light beam is generated by collimating lens 224 set in front of first light source 222. The collimated light beam then passes through a positionable linear polarizer 240. After passing through linear polarizer 240, depending on the orientation of the polarization axis of the linear polarizer 240, the light beam can be either reflected (i.e., to form interrogation light beam 230) or transmitted by the polarized beam splitter 238.

The linear polarizer 240 can be mounted on a selectable stage to change its orientation. For example, the linear polarizer 240 can be mounted on a motorized rotation stage so that it can be continuously rotated over 360° in a plane perpendicular to a direction of the light propagation. When the linear polarizer 240 is positioned in a first orientation (i.e., reflection mode), the collimated light beam from lens 224 is reflected by the polarized beam splitter 238 to the sample. However, when calibration is desired, the linear polarizer 240 can be repositioned to have a second orientation (i.e., transmission mode), such that the collimated light beam from lens 224 passes through the polarized beam splitter 238.

The collimated light from polarized beam splitter 238 can pass through a quarter-wave plate 242 and can be focused by focusing lens 244 onto one of the standard samples 250a-250d of calibration module 246. For example, the calibration module 246 can include one or more standard samples 250a-250d, whose Brillouin signatures (i.e., Brillouin frequency shifts) are pre-determined and stable. In those configurations where more than one standard sample is provided, a switching stage can be provided to select between different standard samples 250a-250d for calibration. For example, calibration module 246 can include a rotatable stage 248 (e.g., turret). Alternatively or additionally, switching between standard samples may be accomplished manually, for example, by removing a standard sample from the focal spot formed by lens 244 and replacing with a different standard sample.

Light from the illuminated one of the standards samples 250a-250d is collected by focusing lens 244 and passes through quarter-wave plate 242, such that the polarization of the collected light causes it to be reflected by the polarized beam splitter 238 en route to the Brillouin spectrometer 200. The control unit 112 can compare the measured Brillouin signature of the standard sample with the known Brillouin signature to correct for variations in the Brillouin modality 110c, including, but not limited to, frequency drift of light source 222 and mechanical drift of the optical components of the Brillouin modality 110c.

Figure 13:
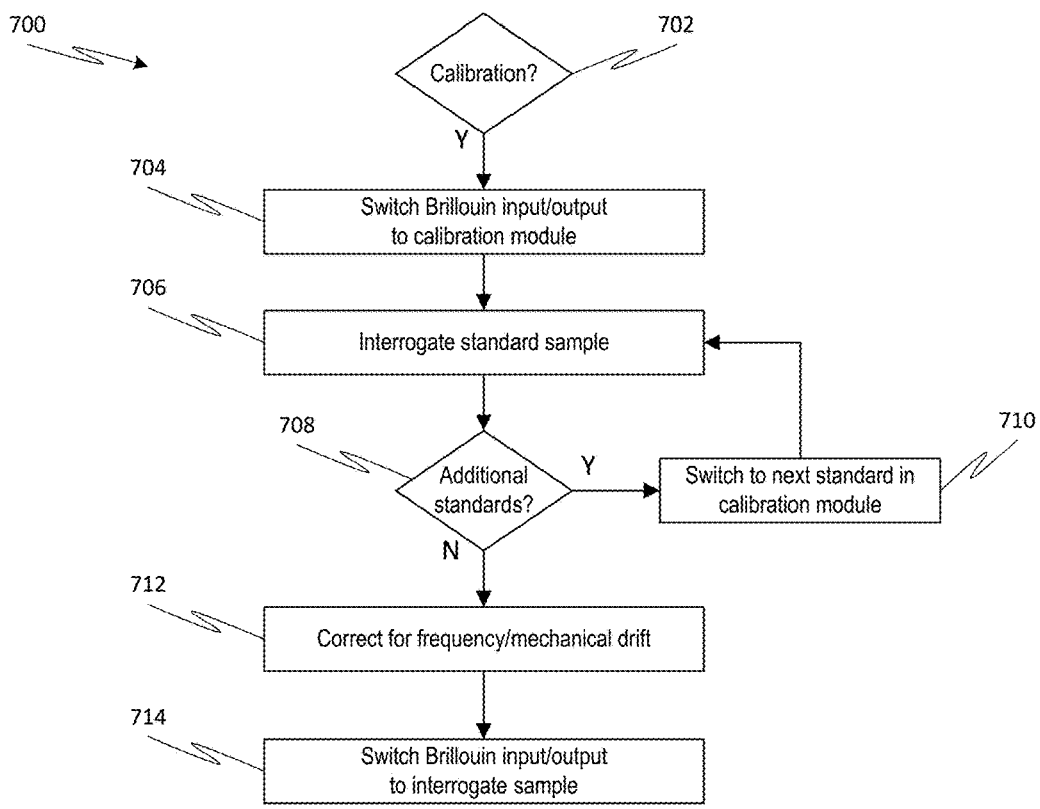
FIG. 13 is an exemplary process flow diagram for in situ calibration of a Brillouin imaging modality, according to one or more embodiments of the disclosed subject matter.

FIG. 13 illustrates an exemplary process flow 700 for in situ calibration of a Brillouin imaging modality, for example, using the calibration module 246 illustrated in FIG. 2D. The process 700 may begin at 702, where it is determined if calibration is desired. The determination of calibration may be done automatically, for example, by control unit 112, or in response to a request from a user of system 100, for example, by appropriate instruction via user interface 116 (e.g., by command icon 358 in FIG. 6). When performed automatically, control unit 112 may instruct for calibration periodically (e.g., at set regular periods, or after expiration of a time since last calibration), upon startup, prior to a Brillouin measurement of sample 102, during Brillouin measurement of sample 102, or any combination thereof.

If calibration is desired at 702, the process 700 can proceed to 704, where the Brillouin modality 110c is switched from a configuration where sample 102 is interrogated to a configuration where one of the standard samples 250a-250d is interrogated. In particular, the orientation of the linear polarizer 240 can be adjusted such that the collimated light from lens 224 passes through the polarized beam splitter 238 so as to be incident on the standard sample 250a via quarter wave plate 242 and focusing lens 250a. Thus, at 706, the standard sample 250a can be interrogated and the resulting Brillouin signature acquired by spectrometer 200 as described above.

If interrogation of other samples is desired at 708, the process 700 can proceed to 710, where selection stage 248 can move second standard sample 250b (or any of the other samples 250c-250d) into place for interrogation at 706. The process can repeat until all standards 250a-250d are analyzed, or only some standards, or only one standard, depending on the particular application. Once all standards have been interrogated, the control unit 112 can process the acquired Brillouin signatures to correct for frequency drift and/or mechanical drift in the Brillouin imaging modality 110c. Alternatively, the correction 712 may occur after interrogation of each sample 706, rather than after interrogation of all samples illustrated in FIG. 13.

With the raw Brillouin spectrum of a sample 102 acquired by the Brillouin spectrometer 200, it may be desirable to correct at least free spectral range and pixel-to-frequency conversion ratio in order to accurately determined the Brillouin shift of the measured sample. Accordingly, in some embodiments, the calibration module 246 includes at least two standard materials with known Brillouin shifts that are measured in process 700 of FIG. 13.

Figure 3:
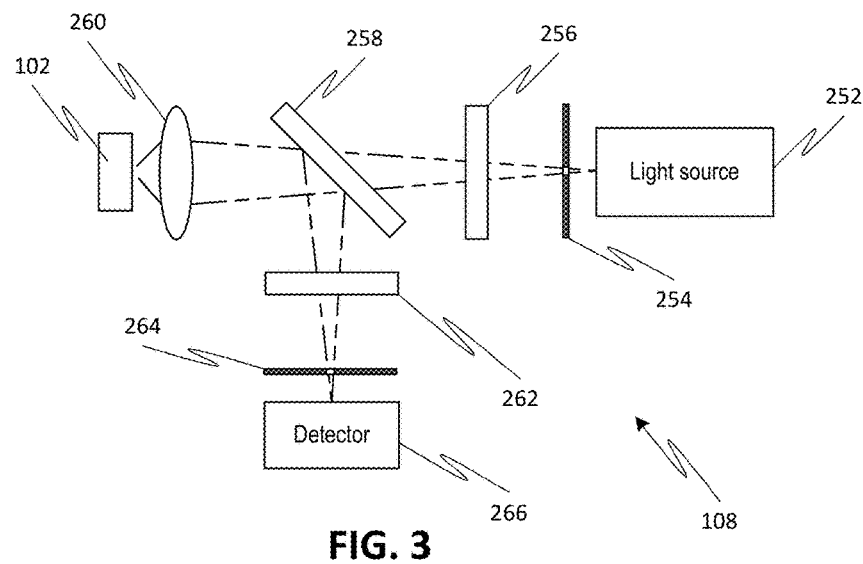
FIG. 3 illustrates an exemplary configuration for an auxiliary imaging modality, according to one or more embodiments of the disclosed subject matter.

Turning to FIG. 3, an exemplary configuration for an auxiliary imaging modality 108 is shown, in particular, a confocal fluorescence configuration. However, as noted above, embodiments of the auxiliary imaging modality may include reflectance imaging, brightfield imaging, fluorescence imaging, multi-photon imaging, phase contrast imaging, differential interference imaging, near-infrared (NIR) reflectance spectroscopy, Fourier-transform infrared (FTIR) spectroscopy, spontaneous Raman spectroscopy, stimulated Raman spectroscopy, frequency comb spectroscopy, or other non-Brillouin modalities. Although these different modalities have not been specifically illustrated herein, one of ordinary skill in the art will readily appreciate how to configure such modalities for combination with the Brillouin modalities based on the teachings of the present disclosure. Accordingly, embodiments of the disclosed subject matter are not limited to the auxiliary imaging modality specifically illustrated in FIG. 3.

The confocal fluorescence imaging modality of FIG. 3 includes a second light source 252 that generates an interrogating light beam that passes through confocal aperture 254 (e.g., pinhole) and a selection filter 256, which selects for a particular excitation wavelength. The filtered light then proceeds through beam splitter 258 (e.g., 50-50 beam splitter) so as to be focused on the sample 102 via objective lens 260. The interrogating light causes excitation of fluorescence which is collected by the objective lens 260 and reflected by beam splitter 258. The reflected fluorescence is thus directed to detector 266 via selection filter 262, which selects for the particular fluorescence wavelength and rejects the excitation wavelength, and confocal aperture 264 (e.g., pinhole).

As referenced above, the optical system 100 can be designed to avoid optical crosstalk between the Brillouin modality 110 and the auxiliary imaging modality 108. In the configuration illustrated in FIG. 3, the wavelength of the light source 252, the selection filter 256, and the selection filter 262 of the auxiliary imaging modality 108 should be carefully chosen to avoid interaction with light used by the Brillouin imaging modality 110. For example, the wavelength of light source 252 should be far away (e.g., at least 5 nm difference) from the wavelength of light source 222 of the Brillouin imaging modality 110, so that they are spectrally separable by optical components and detectors. For fluorescent confocal imaging, both the excitation wavelength band, which is determined by selection filter 256, and the emission wavelength band should be selected so as not to overlap with the wavelength of light source 222 of the Brillouin imaging modality 110. For example, the wavelengths for the emission in the auxiliary imaging modality 108 may be at least 10 nm from the wavelength of the light source 222 of the Brillouin imaging modality 110.

Figure 4A:
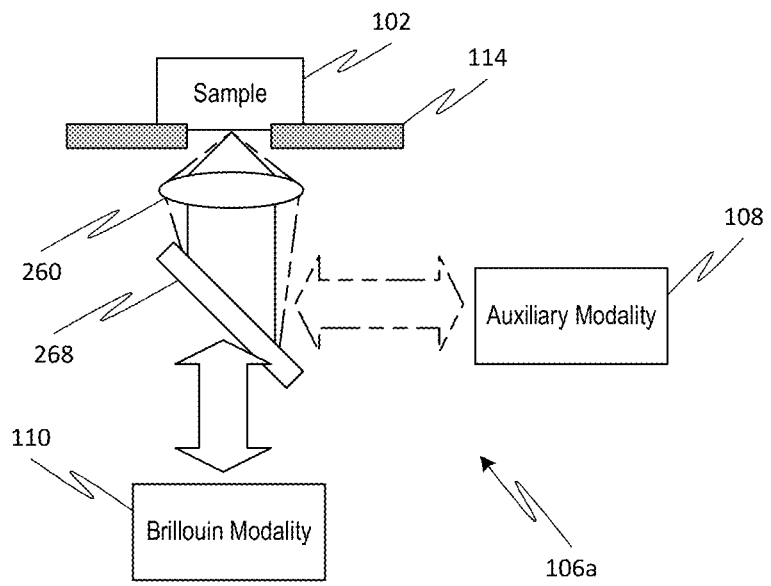
FIG. 4A illustrates a first exemplary configuration to couple light to/from the Brillouin and auxiliary imaging modalities, according to one or more embodiments of the disclosed subject matter.

FIG. 4A shows an exemplary configuration 106a for coupling the Brillouin imaging modality 110 and the auxiliary imaging modality 108 together. For example, the coupling optics can include a dichroic mirror 268 that allows transmission of Brillouin light between the sample 102 and the Brillouin modality 110 via objective lens 260. The dichroic mirror 268 also reflects light between sample 102 and the auxiliary imaging modality 108. Alternatively or additionally, the dichroic mirror 268 may be replaced by a narrow-band filter in combination with a beam splitter. As a result, the region of sample 102 interrogated by the Brillouin modality 110 can be co-registered with that interrogated by the auxiliary modality 108, thereby allowing for simultaneous or sequential data acquisition by modalities 108, 110.

However, the optical path sharing between the Brillouin modality 110 and the auxiliary imaging modality 108 can lead to undesirable cross-talk. Accordingly, the dichroic mirror 268 should be carefully designed to prevent (or at least reduce) light from the auxiliary imaging modality 108 from reaching the Brillouin imaging modality 110. For example, the dichroic mirror 268 may transmit substantially all (i.e., nearly 100%) light at the wavelength of the Brillouin modality 110 (i.e., light source 222) while reflecting substantially all (i.e., nearly 100%) light related to by the auxiliary imaging modality 108. For example, when the auxiliary imaging modality 108 is a fluorescence imaging modality, the dichroic mirror 268 should reflect substantially all light having a wavelength of the fluorescent emission light from the sample 102.

In some embodiments, the auxiliary imaging modality 108 and the Brillouin imaging modality 110 may operate serially rather than in parallel. For example, in some circumstances, the sample 102 may not move much within a planned measurement period, such as when a cell is attached to a substrate. In such cases, it may be desirable to acquire the auxiliary imaging modality 108 first, and then switch to the Brillouin modality 110 for subsequent interrogation of the sample. In such instances (or in any other instance where such a configuration may be desirable), the dichroic mirror 268 of FIG. 4A can be replaced with selectable optical pathways, for example, as shown in FIGS. 4B-4C.

Figure 4B:
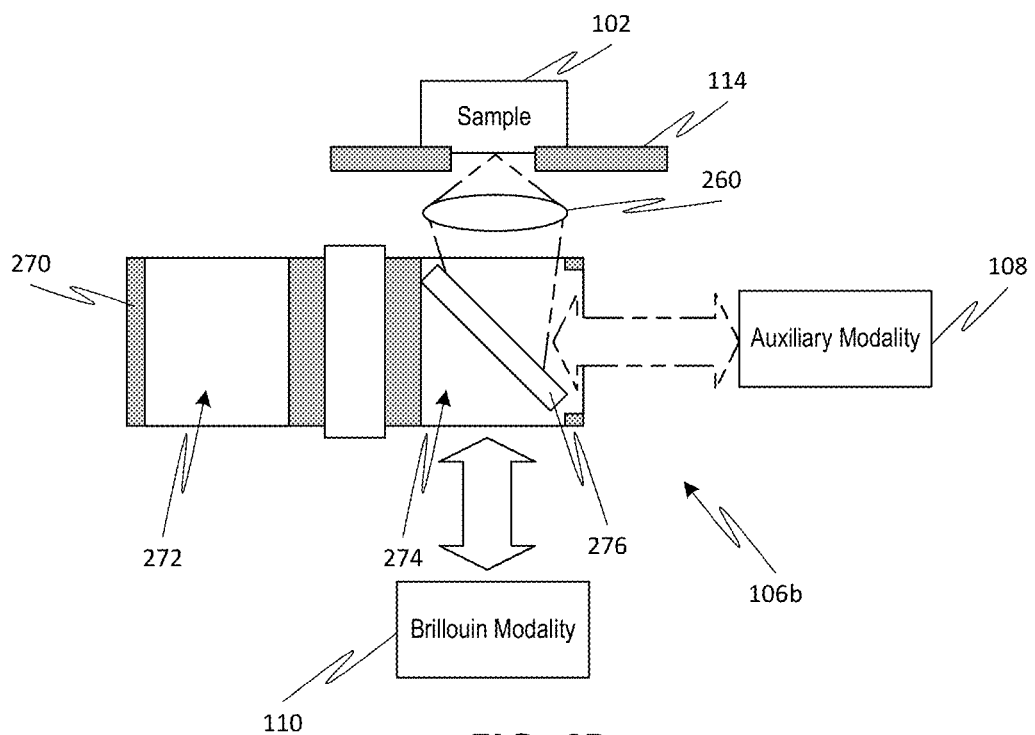
FIG. 4B illustrates a second exemplary configuration to couple light to/from the Brillouin and auxiliary imaging modalities, according to one or more embodiments of the disclosed subject matter.
Figure 4C:
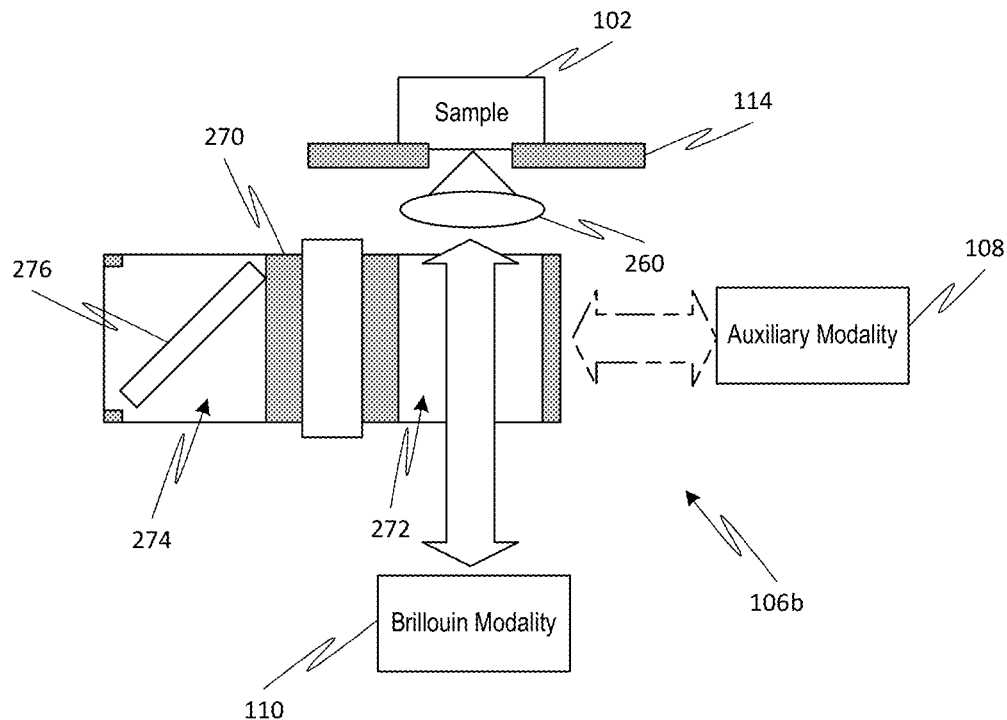
FIG. 4C illustrates the second exemplary configuration of FIG. 4B in an alternate selection state, according to one or more embodiments of the disclosed subject matter.

The coupling optics 106b of FIGS. 4B-4C can include a selection device 270, for example, a turret, that has a first optical pathway 272 for selection of the Brillouin imaging modality 110 to interrogate the sample 102, and a second optical pathway 274 for selection of the auxiliary imaging modality 108 to interrogate the sample 102. For example, the second optical pathway 274 can include a mirror 276. In a first orientation of the selection device 270, the light to/from the auxiliary imaging modality is reflected by mirror 276 in the second optical pathway 274 from/to the sample 102, as illustrated in FIG. 4B. When Brillouin measurement is desired, the selection device 270 can rotate to a second orientation, where light from the auxiliary imaging modality 108 is blocked in favor of allowing light to/from the Brillouin imaging modality 110 to pass along the first optical pathway 272 to the sample, as illustrated in FIG. 4C. Although illustrated as a turret, other configurations for the selection device 270 are also possible according to one or more contemplated embodiments. For example, the selection device 270 may include a linear actuator that moves horizontally to switch between the first and second optical pathways.

Figure 4D:
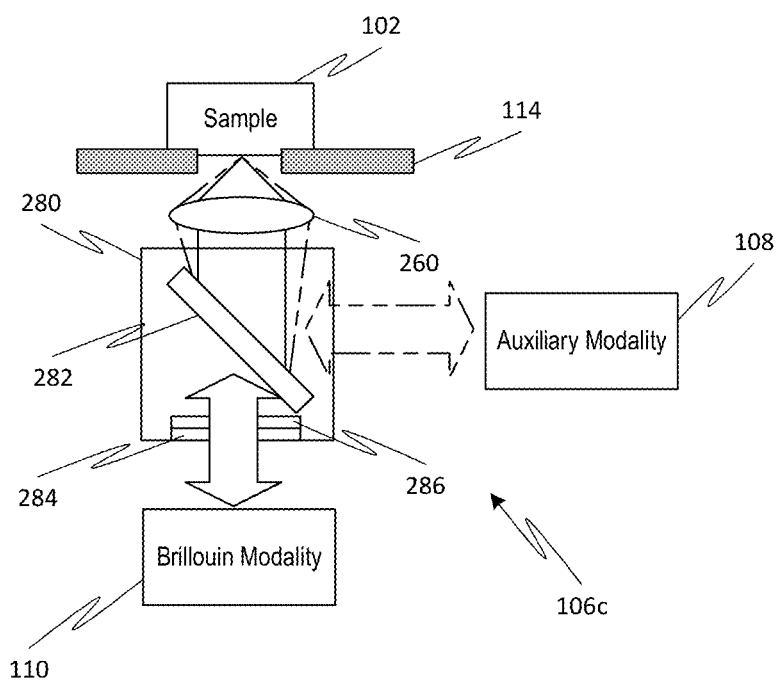
FIG. 4D illustrates a third exemplary configuration to couple light to/from the Brillouin and auxiliary imaging modalities, according to one or more embodiments of the disclosed subject matter.

It is also possible to combine one or more components of the Brillouin imaging module 110 with the coupling optics 106. Such a combination may be especially useful (but is not limited to) when the Brillouin imaging module 110 is constructed as an add-on module to an existing microscope setup. FIG. 4D illustrates an exemplary configuration for coupling optics 106c where at least the quarter wave plate of the Brillouin imaging modality 110 is integrated with a dichroic mirror. For example, the coupling optics 106c can be constructed as a Brillouin filter cube 280, which may be inserted into an appropriate receptacle of a microscope, such as filter cube turret of an existing fluorescence microscope.

Similar to the configuration of FIG. 4A, the filter cube 280 can include a dichroic mirror 282 properly designed to reflect light related to the auxiliary imaging module 108 while allowing the Brillouin light to pass therethrough. The filter cube 280 can include a quarter wave plate 284 between the dichroic mirror 282 and the Brillouin modality 110, and thus takes the place of quarter wave plate 236 in the configurations of FIGS. 2C-2D, for example. Optionally, the filter cube 280 may also include a narrowband filter 286 between the dichroic mirror 282 and the Brillouin modality 110, and thus takes the place of narrowband filter 232 in FIGS. 2B-2D, for example. By simply inserting the filter cube 280 into an existing microscope setup, the setup can be easily reconfigured to allow the combination of the Brillouin modality 110 with an existing auxiliary imaging modality 108.

Although a particular arrangement of the Brillouin and auxiliary imaging modalities with respect to the coupling optics has been illustrated in FIGS. 4A-4D, the opposite arrangement is also possible according to one or more contemplated embodiments. For example, the dichroic 268 in FIG. 4A could be configured to reflect Brillouin light and to transmit the auxiliary light, with the Brillouin 110 and auxiliary 108 modalities in effect trading places. Similarly, dichroic 282 in FIG. 4D could be configured to reflect Brillouin light and to transmit the auxiliary light, with the Brillouin 110 and auxiliary 108 modalities in effect trading places, and the optical elements 284, 286 being rearranged along the Brillouin light path. In FIGS. 4B-4C, it is also possible that the Brillouin 110 and auxiliary 108 modalities could trade places. Accordingly, embodiments of the disclosed subject matter are not limited to the specific arrangements illustrated in FIGS. 4A-4D.

Figure 5A:
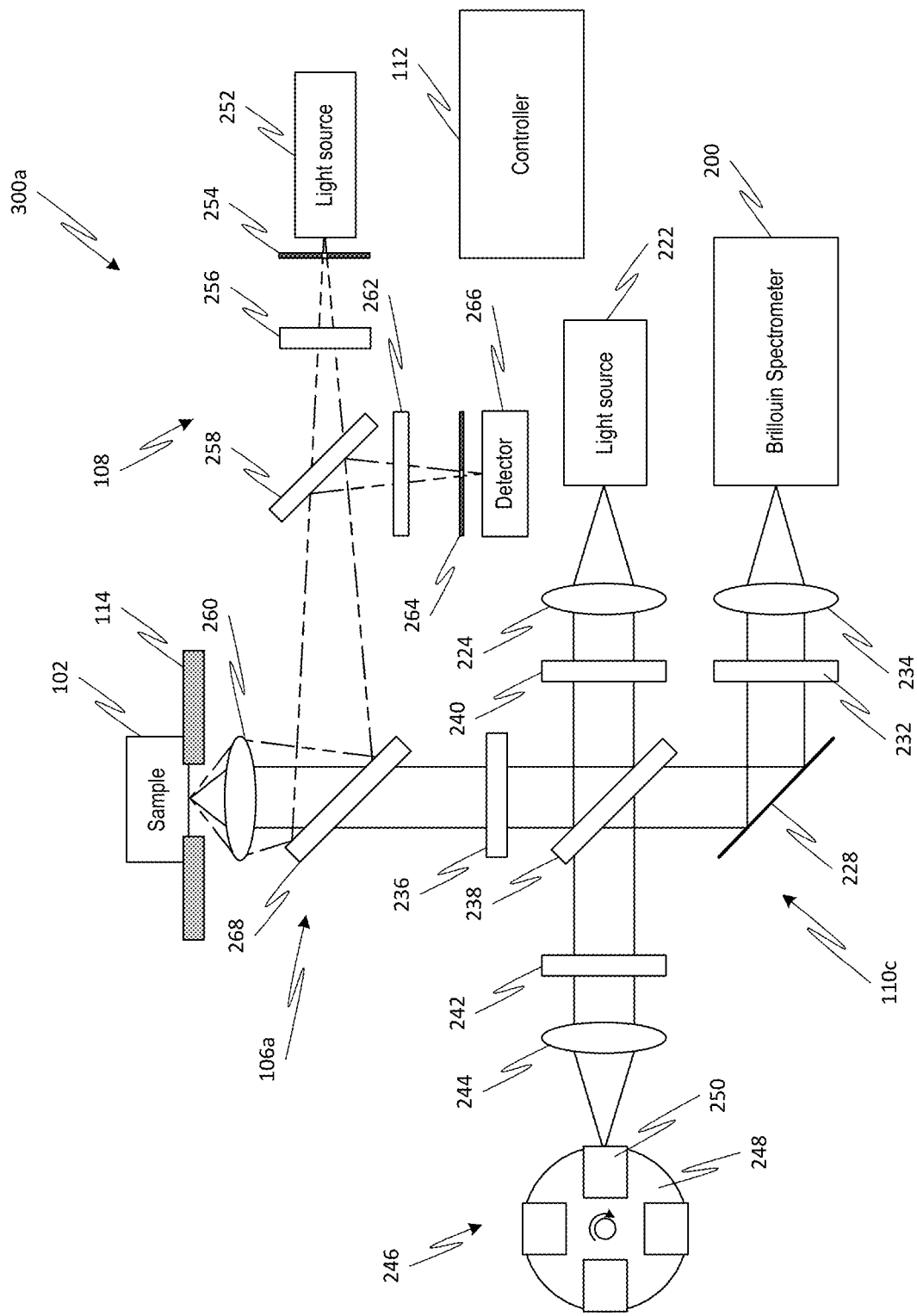
FIG. 5A illustrates a first exemplary microscope system incorporating Brillouin and auxiliary imaging modalities, according to one or more embodiments of the disclosed subject matter.

A Brillouin imaging modality (e.g., any one of the configurations illustrated in FIGS. 2B-2D or otherwise) can be combined with one or more auxiliary imaging modalities (e.g., an exemplary configuration illustrated in FIG. 3 or as otherwise known in the art) using a coupling optics configuration (e.g., any one of the configurations illustrated in FIGS. 4A-4D or otherwise) into a microscope system. For example, FIG. 5A illustrates an exemplary microscope system 300a, which combines the Brillouin imaging modality 110c of FIG. 2D and the auxiliary imaging modality 108 (i.e., confocal fluorescence) of FIG. 3 using the coupling configuration 106a of FIG. 4A.

In some embodiments, as noted above, the Brillouin imaging modality 110, or components thereof, can be constructed as a modular unit. The modular unit can then be added to an existing microscope system by coupling the Brillouin input/output optical path to the microscope and making appropriate adjustments to any existing coupling components in the microscope system to prevent crosstalk between the auxiliary imaging modality and the Brillouin imaging modality.

Figure 5B:
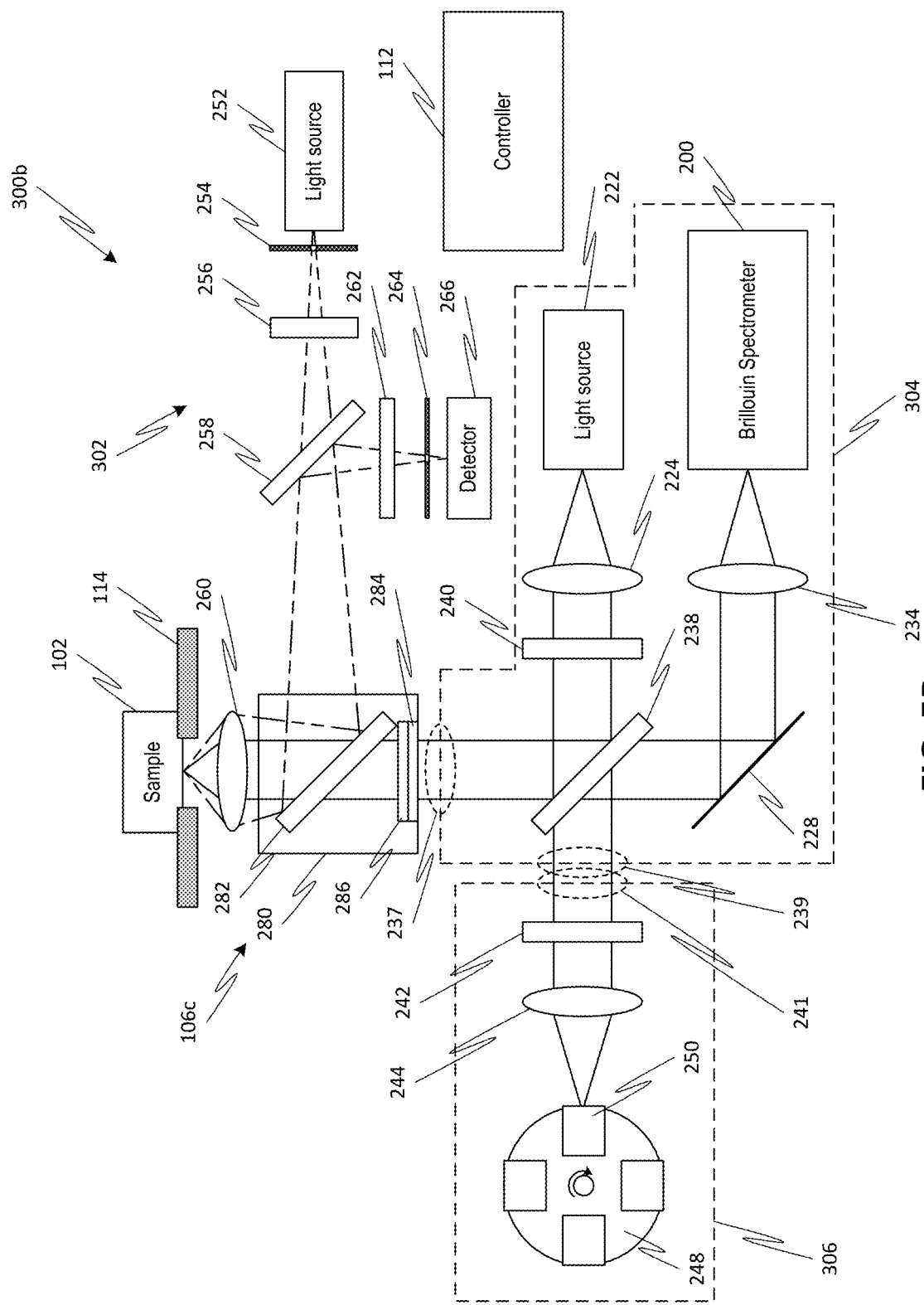
FIG. 5B illustrates a second exemplary microscope system incorporating a Brillouin imaging module coupled to an existing auxiliary imaging modality, according to one or more embodiments of the disclosed subject matter.

For example, FIG. 5B illustrates another exemplary microscope system 300b, which combines the Brillouin imaging modality 110c of FIG. 2D (minus the quarter wave plate 236 and narrowband filter 232, which are otherwise integrated in filter cube 280) and the auxiliary imaging modality 108 of FIG. 3 using the coupling configuration 106c of FIG. 4D. In particular, the Brillouin imaging modality may be constructed as a self-contained modular unit 304, which can be installed in the existing microscope setup by coupling input/output port 237 to a corresponding port on the microscope. For example, the Brillouin beam reflected by the polarized beam splitter 238 can be coupled into a commercial confocal microscope (e.g., an inverted microscope such as the Olympus IX71) through its right-side port, left-side port, or lower-back port. A Brillouin filter cube 280 (with appropriate dichroic mirror 282, quarter wave plate 284, and narrowband filter 286) can be installed into the existing microscope setup, thereby modifying the existing system for combined Brillouin and auxiliary imaging. In some embodiments, the calibration unit may also be constructed as a separate, self-contained modular unit 306, which can be coupled to calibration input/output port 239 of the Brillouin module 304 via input/output port 241. Alternatively, the calibration unit may be an integral part of the Brillouin module 304 (i.e., without separate input/output ports 239, 241).

Figure 5C:
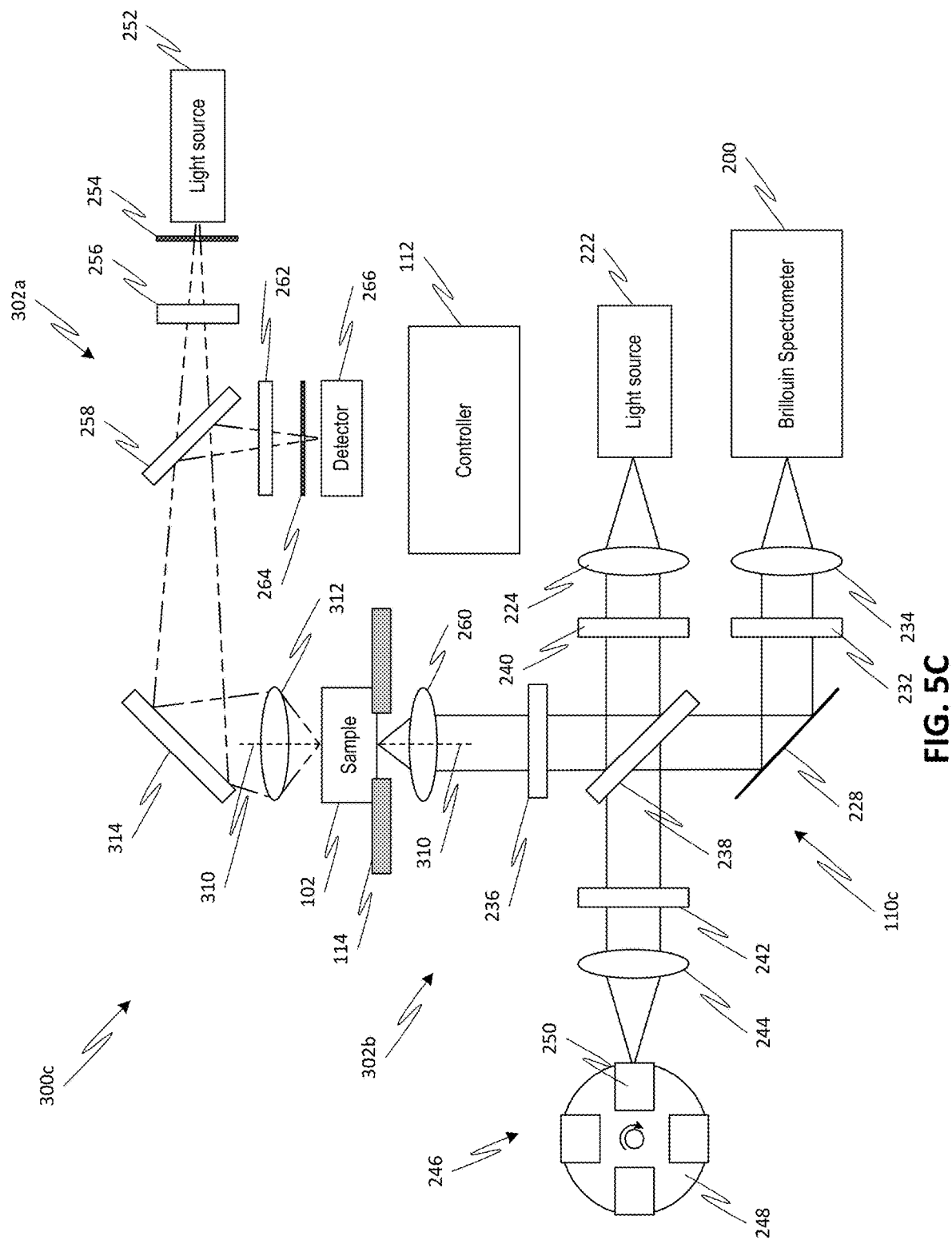
FIG. 5C illustrates a third exemplary microscope system incorporating a Brillouin imaging modality mounted opposite an auxiliary imaging modality with respect to a sample, according to one or more embodiments of the disclosed subject matter.

As referenced above, it is not necessary that the Brillouin imaging modality 110 share the same microscope optics as the auxiliary imaging modality 108. Rather, in some embodiments, the Brillouin imaging modality 110 can have its own microscope optics separate from that of the auxiliary imaging modality 108. For example, FIG. 5C shows an exemplary microscope system 300c where the Brillouin and auxiliary imaging modalities have separate microscope objective lenses 260, 312, respectively, on opposite sides of sample 102. In FIG. 5C, the microscope system 302a includes the Brillouin imaging modality 110c of FIG. 2D in an inverted microscope portion 302b and the auxiliary imaging modality 108 of FIG. 3, with certain changes to accommodate the optical path, in an upright microscope portion 302a. For example, the auxiliary imaging modality can include a mirror 314 that reflects the input/output light between the second objective 312 and the confocal components of the auxiliary imaging modality. Of course, it is also possible that mirror 314 can be eliminated, in which case, the confocal components of the auxiliary imaging modality would be reoriented, for example, by rotating 90° to be on axis with objective 312. The inverted microscope portion 302b has the input/output beam of the Brillouin imaging modality directly coupled to object lens 260, i.e., without an intervening dichroic mirror.

As referenced above, the use of different microscope portions for the Brillouin imaging modality and the auxiliary imaging modality requires correlation or co-registration, such that the data between the two modalities can be readily correlated. Thus, the objective lens 260 and the objective lens 312, as well as their corresponding optical paths, may be aligned along line 310 (i.e., in the plane of the sample) to ensure that the same portion of the sample is imaged by both modalities. For example, the upright microscope portion 302a may be carefully pre-aligned so that the focused Brillouin beam spot from the inverted microscope portion 302b located in the center of the field of view of the upright microscope portion 302a. Further calibration between the microscope portions 302a, 302b can ensure correlation in the depth direction (i.e., in a direction along line 310) as well.

In embodiments, the control unit 112 can control operation of the microscope system, as well as the underlying Brillouin and auxiliary imaging modalities, to perform various functions. To allow communication between the control unit 112 and a user of the microscope system, an interface 116 (e.g., an interactive screen on a computer, an app on a smartphone, etc.) can be provided with one or more command icons 352-362, as shown in FIG. 6, that allow activation of a particular microscope function. The user interface 116 may also include a display 350, which may display resulting images in real-time (or substantially in real-time) or provide an image for selection of a region of interest by a user. Alternatively or additionally, the display 350 may be separate from the user interface or may populate on the user interface after selection of an appropriate command.

For example, the user interface 116 may include a command icon 352 that instructs a Brillouin measurement of the sample by the Brillouin imaging modality 110, which measurement may be unrestricted (i.e., interrogating a relatively larger area of the sample). As noted above, such unrestricted Brillouin measurements may take a substantial amount of time and may be problematical in some applications. Thus, the user interface 116 may also include a command icon 354 that instructs imaging of the sample by the auxiliary imaging modality 108 for selection of a region of interest.

For example, FIG. 7 illustrates an exemplary process 400 for obtaining a Brillouin measurement of a sample based on a region of interest defined using an auxiliary imaging modality 108. At 402, an image of the sample can be acquired using the auxiliary imaging modality 108. Preferably, the auxiliary imaging modality 108 is co-located in the same microscope setup as the Brillouin imaging modality 110 (e.g., as illustrated in FIGS. 5A-5C), such that the auxiliary image can be readily correlated to the Brillouin modality; however, in some embodiments and applications (e.g., where the sample is substantially static over time and can be easily correlated between setups), the auxiliary imaging modality 108 can be in a separate microscope setup from that of the Brillouin imaging modality 110.

After obtaining the auxiliary image, the process 400 can proceed to 404, where a region of interest, less than the entire field of view, is selected for further investigation by the Brillouin imaging modality. For example, the auxiliary image may be displayed to the user by display 350, and the user can select a region of interest for further interrogation in the auxiliary image at 404. Alternatively or additionally, the control unit 112 may process the auxiliary image based on predefined or user-selected criteria (e.g., a threshold value or pattern) to automatically define a region of interest. The region of interest can be a point, a line or contour, a two-dimensional area, or a three-dimensional volume.

For example, FIG. 8A shows an image 408 of an attached cell acquired by an auxiliary imaging modality (e.g., confocal fluorescence microscopy). If the investigation of the cell is concerned with determining the mechanical properties of the cell nucleus, a two-dimensional region of interest 410 can be defined by locating the nuclear region in the auxiliary image 408. The selected region can then be used as a guide for scanning of the cell with the Brillouin modality. Because only the region of interest 410 is investigated rather than the whole cell, the acquisition time for the Brillouin image can be considerably reduced.

Thus, after selection of the region of interest, the process 400 can proceed to 406 in FIG. 7, where the region of interest is interrogated by the Brillouin imaging modality 110. For example, the user interface 116 may also include a command icon 356 (FIG. 6) that instructs imaging of the defined region of interest by the Brillouin imaging modality 110, which restricted image may be displayed in real-time (or substantially in real-time) on display 350 and may be overlaid on or independent of the auxiliary image. Alternatively, command icon 356 may be combined with command icon 354, such that the restricted Brillouin imaging is carried out automatically after selection of the region of interest in the auxiliary image.

The region of interest technique of FIG. 7 can be broadly applied to combinations of Brillouin imaging modality with many other optical modalities (e.g. multi-photon microscopy, phase-contrast microscopy, optical coherence tomography, reflectance, fluorescence, Raman spectroscopy) that identify specific regions (e.g. points, lines in 2D or 3D, areas in 2D or 3D) of interest within a cell, for example, by fluorescent tagging or by Raman measurements. In addition, several image processing techniques known in the art can be used to further optimize the identification of targets within an image where Brillouin analysis needs to be performed. Therefore, using the information of the relatively faster auxiliary imaging modality can significantly improve the speed and effectiveness of Brillouin measurements by dramatically reducing the number of spectral points to acquire.

Although the discussion above (and elsewhere herein) focuses on measurement/imaging of a single cell, embodiments of the disclosed subject matter are not limited thereto. Indeed, other than a single cell, the measured objects could be any sample whose mechanical properties (in one, two, or three dimensions) are desired to be studied. For example, to study the correlation of cell mechanotransduction or migration pattern to the stiffness of the substrate, a polyacrylamide gels with stiffness gradients or lines of attaching ligands can be coated on a rigid substrate. Using embodiments of the disclosed subject matter, a scanning of the cells placed on the gel along the gradient line can rapidly acquire cellular mechanical properties of the cells. In another example, embodiments of the disclosed subject matter can be used to monitor the 3D organogenesis of certain organs within an embryo body during embryonic development. Depending on the application, the Brillouin scanning pattern could be a 1D line, a 2D rectangle, or a 3D geometry consisting of multiple 2D sections.

Returning to FIG. 6, the user interface 116 may also include a command icon 358 that instructs calibration of the Brillouin imaging modality 110, for example, using calibration module 246. Selection of the command icon 358 can thus cause the Brillouin imaging modality to redirect light to the calibration module 246, e.g., by changing the orientation of the linear polarizer 240, and to adjust the Brillouin measurements to compensate for mechanical or frequency drift, as described above with respect to FIG. 13. Alternatively or additionally, the command icon 358 may be combined with command icon 352 and/or 356, such that calibration is performed before each Brillouin imaging. Alternatively or additionally, the control unit 112 can be configured to automatically carry out in situ calibration at regular intervals.

The user interface 116 may also include a command icon 360 that instructs unmixing of a Brillouin measurement. In response to command 360, the control unit 112 can control the Brillouin modality 110 and the auxiliary imaging modality 108 to automatically acquire respective data simultaneously or sequentially, and to process the Brillouin data based on the auxiliary image data to remove artefacts therefrom.

Figure 9A:
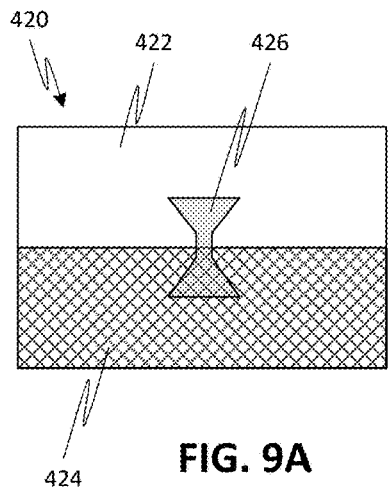
FIG. 9A illustrates a simplified cross-sectional view of a sample interrogated by a Brillouin imaging modality, according to one or more embodiments of the disclosed subject matter.
Figure 9B:
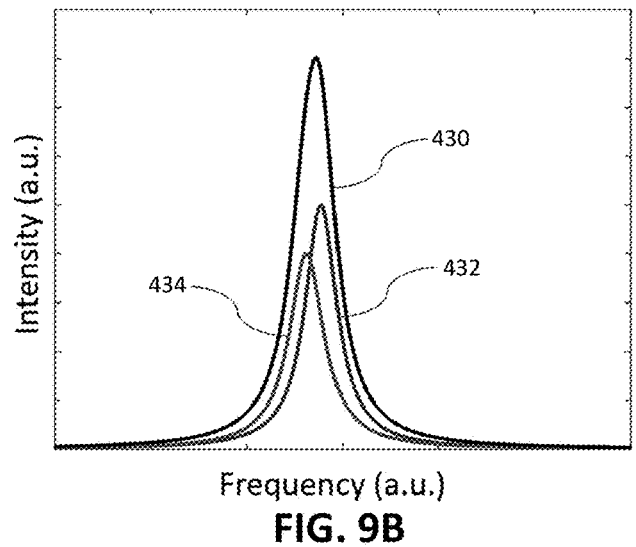
FIG. 9B is a graph of resulting Brillouin signatures for the sample of FIG. 9A obtained by the Brillouin imaging modality, according to one or more embodiments of the disclosed subject matter.

For example, FIG. 9A illustrates an example of Brillouin signal mixing that may result in undesirable artefacts. The recorded Brillouin signal at each position of the sample 420 comes from all the backscattered light within the whole volume (voxel 426) of the focused beam spot, whose 2D cross-section is shown. However, since the sample 420 may be heterogeneous within its cross-section (i.e., composed of different constituent materials 422, 424 with different properties), the voxel 426 may end up interrogating different materials 422, 424 simultaneously. Alternatively, the illustration in FIG. 9A may represent a sample material 424 that is bordered by a surrounding medium 422 (e.g., a cell based in a culture medium). The signal detected by the Brillouin spectrometer is thus an average of the Brillouin signatures (i.e. Brillouin frequency shifts) from each material. For example, FIG. 9B shows the Brillouin signature 432 of material 422 and Brillouin signature 434 of material 424. While the Brillouin frequency shifts (i.e., the location of the peak of the respective curve) are close, they are nevertheless different. The detected signature 430 corresponding to the voxel 426 is thus a combination of the underlying signatures 432, 434, and does not accurately reflect either material 422, 424.

Figure 10:
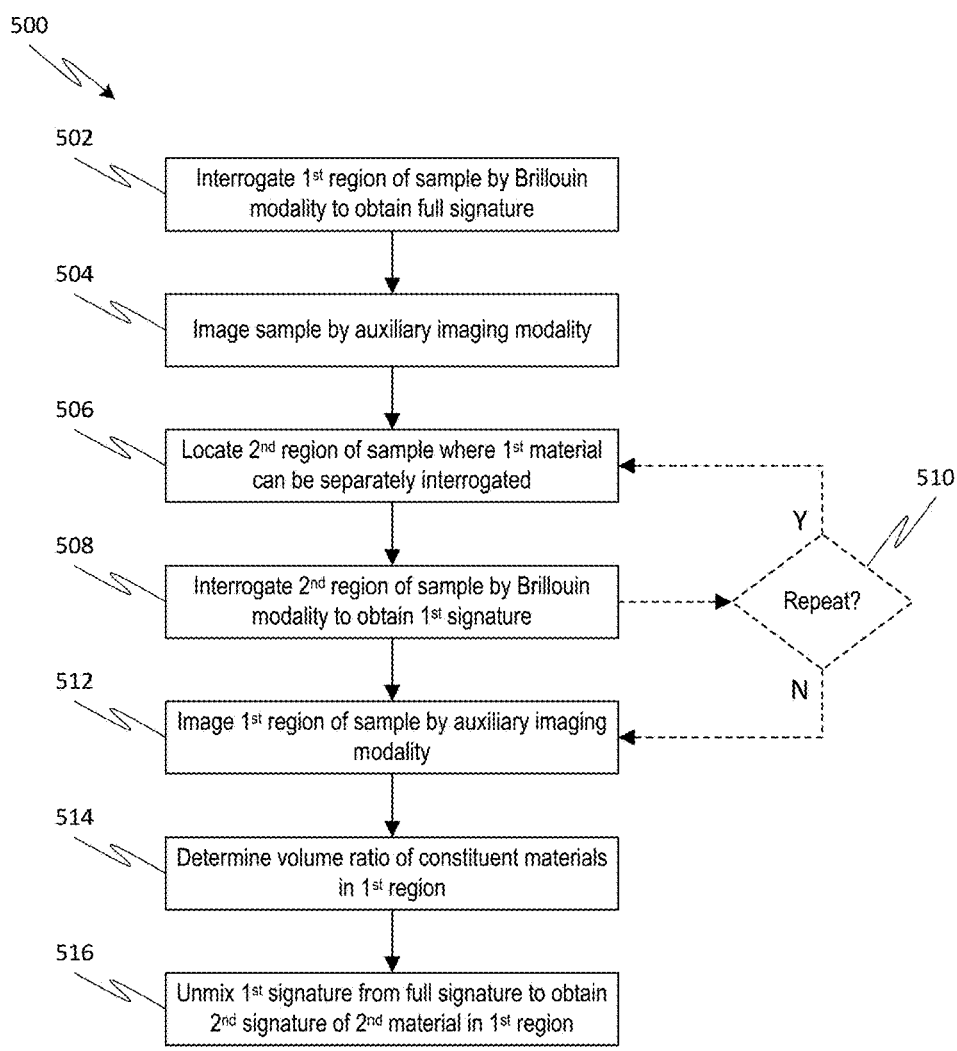
FIG. 10 is an exemplary process flow diagram for unmixing Brillouin signatures of constituent materials in a sample based on information from an auxiliary imaging modality, according to one or more embodiments of the disclosed subject matter.

According to embodiments of the disclosed subject matter, information from the auxiliary imaging modality can be used to unmix the Brillouin signatures to obtain more accurate data than is otherwise possible with the Brillouin imaging modality alone. For example, FIG. 10 illustrates an exemplary process 500 for unmixing Brillouin signatures. At 502, a first region of the sample can be interrogated by the Brillouin imaging modality 110 to obtain a full (i.e., mixed) signature. As noted above, within one or more Brillouin imaging voxels, the sample may have a heterogenous composition, such that the full Brillouin signature for said voxel would not accurately correspond to the constituent materials. The process 500 can proceed to 504, where the sample is also imaged by the auxiliary imaging modality. Note that it is also possible for the auxiliary imaging of 504 to precede the Brillouin imaging of 502, or for the auxiliary imaging of 504 to be omitted altogether (i.e., where a location of the second region is otherwise already known or an unmixed Brillouin signature of at least one of the constituent materials has otherwise already been obtained).

The process 500 can proceed to 506, where a second region of the sample is located. For example, the second region can be a portion of the sample or its surrounding medium that is substantially homogeneous with respect to one of the materials within the voxels during the Brillouin imaging of 502. At 508, this second region can then be interrogated using the Brillouin imaging modality in order to obtain an unmixed Brillouin signature corresponding to that material. If possible or desirable, 506 and 508 may be repeated at 510 for different materials that are contained in the voxels during the Brillouin imaging of 502.

Once unmixed Brillouin signatures have been obtained for one or more of the materials contained in the voxels of the Brillouin imaging of 502, the process 500 can proceed to 512, where the auxiliary imaging modality can interrogate the first region. Based on information obtained from the auxiliary imaging modality, a volume ratio of materials in the first region can be determined at 514. At 516, the determined volume ratio and the unmixed Brillouin signature can be used to unmix the Brillouin signature obtained in 502, thereby providing a more accurate Brillouin signature for the remaining materials.

For example, in interrogating a cell within a culture medium by the Brillouin imaging modality, the surrounding medium may be within the interrogating voxel and thus skew the measured Brillouin signature. By measuring the surrounding medium only at 506, the unmixed Brillouin signature of the medium can be obtained. The cell can be stained, and the fluorescent intensity acquired using an auxiliary imaging modality (e.g., confocal fluorescence imaging) at 512. Based on the fluorescent image, the volume ratio of the surrounding medium within the voxel can be quantified at 514. Once volume ratios are known, the Brillouin signal of the surrounding medium can be subtracted from the mixed Brillouin signal of the entire voxel, and the Brillouin signature of the cell can be obtained at 516. Of course, other image/data processing techniques known in the art and more sophisticated than signal subtraction are also possible for the unmixing of 516.

Although fluorescence imaging is mentioned above, other imaging modalities could also be used to quantify volume ratios within voxels according to one or more contemplated embodiments. For example, in thin 2D samples, phase-contrast or differential interference contrast microscopy modalities could be combined with Brillouin microscope. In such an example, the edge of a thin sample can be clearly identified from the surrounding aqueous medium by the auxiliary modality. The co-registered phase-contrast or differential interference contrast image thus can provide the volume ratio between the sample and the surrounding aqueous medium at the interface region, which can be used to remove the artefact caused by the aqueous medium. In another example, absorption dye can be added to the surrounding medium to exclude light therefrom. Using the auxiliary imaging modality (e.g., a confocal microscope) images can be taken before and after addition of the absorption die. The interface of the sample and surrounding medium can be identified after image subtraction, and the artefact of Brillouin signal can be removed accordingly.

FIGS. 11A-11D relate to a proof-of-concept experiment that demonstrates the effect of Brillouin signal mixing and the corresponding method for Brillouin signal unmixing. In particular, the experiment was implemented in the microscope setup of FIG. 5A by replacing the objective lens 260 and sample 102 with the configuration 550 of FIG. 11A. The configuration 550 includes a first sample 556 (i.e., glycerol solution) and a second sample 554 (i.e., water) 511, a 50:50 beam splitter 552, a first focusing lens 558 and a second focusing lens 560. This configuration 550 allows for the simultaneous measurement of two samples with Brillouin modality 110 and mimics the situation where the beam voxel is at the interface of two different materials.

Figure 11A:
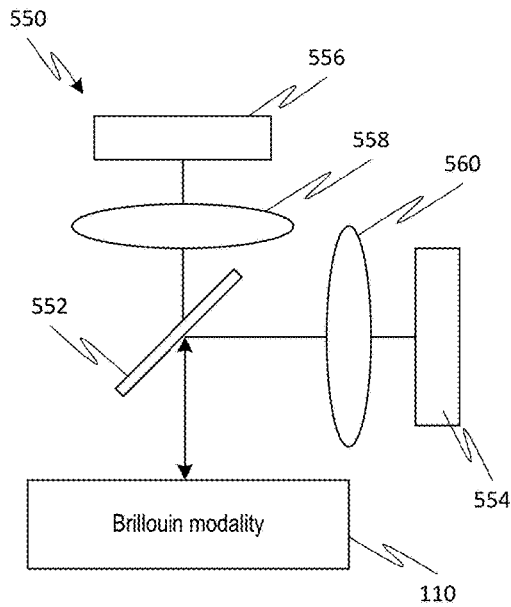
FIG. 11A illustrates an exemplary testing setup used to validate the Brillouin signature unmixing concept based on information from an auxiliary imaging modality.
Figure 11B:
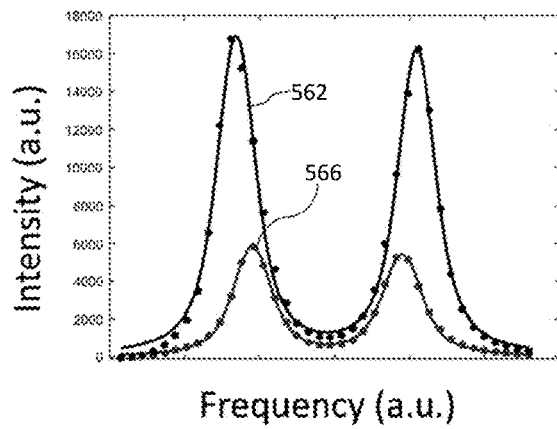
FIG. 11B is a graph of Brillouin signatures corresponding to the setup of FIG. 11A.

A typical Brillouin spectrum measured by the Brillouin modality 110 can have two peaks (i.e., Stokes and anti-Stokes components), the distance between which is indicative of the corresponding Brillouin frequency shift. For example, FIG. 11B shows the measured mixed Brillouin spectrum 562 for the combination of the glycerol 556 and water 554. If the glycerol 556 is measured by itself (e.g., by blocking the optical path of the water 554), the Brillouin signature 566 can be obtained. Because of the introduction of the water signal, the measured curve 562 shows a larger distance of peaks (indicating smaller Brillouin frequency shift) than the Brillouin signature of glycerol 566 by itself.

Figure 11C:
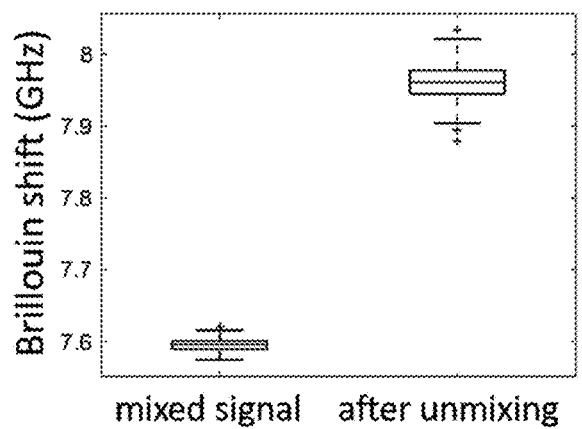
FIG. 11C is a graph of measured Brillouin shifts corresponding to the setup of FIG. 11A, before and after unmixing, according to one or more embodiments of the disclosed subject matter.

To quantify the difference, the measurement was repeated 200 times for both cases (i.e., for the combination of glycerol 556 and water 554, and for glycerol 556 alone). The measured Brillouin shift is shown in the boxplot of FIG. 11C. The result indicates that the discrepancy of the Brillouin shift between the mixed signal (curve 562) and the unmixed signal (curve 566) is about 0.36 GHz. Considering that the instrumental precision is only 0.01 GHz, the artefact introduced by the mixed Brillouin signal of a voxel could be, for example, more than 30 times the instrumental precision, which would completely undermine the accuracy of Brillouin measurement unless corrected.

Figure 11D:
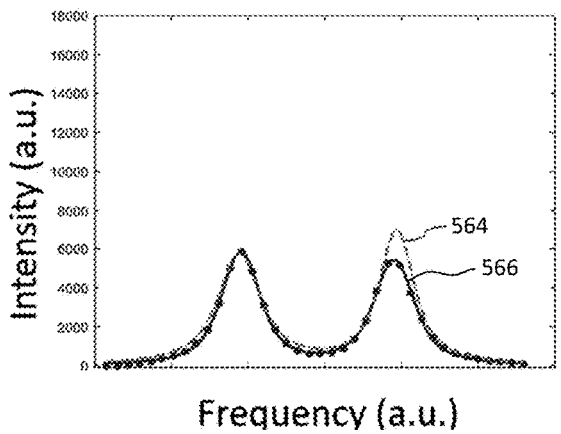
FIG. 11D is a graph of Brillouin signatures corresponding to the setup of FIG. 11A after unmixing, according to one or more embodiments of the disclosed subject matter.

The mixed signal 562 is a result of the linear superposition of the corresponding Brillouin signature of each constituent material. To verify, the Brillouin signature of the water 554 by itself was measured by blocking the optical path of the glycerol 556. The Brillouin signature of the water 554 was then subtracted from the mixed signal 562, resulting in the unmixed signature 564 for glycerol 556 illustrated in FIG. 11D. Note that curve 566 in FIG. 11D is the Brillouin signature of the glycerol obtained from direct measurement in FIG. 11B. The perfect frequency overlap between curves 564 and 566 indicates the successful recovery of the Brillouin signature of the glycerol. The results of FIG. 11D further demonstrate that a mixed Brillouin signal from two materials within the same voxel of the Brillouin beam can be unmixed with extra information, such as the Brillouin signature as well as volume ratio of one of the materials.

Figure 12A:
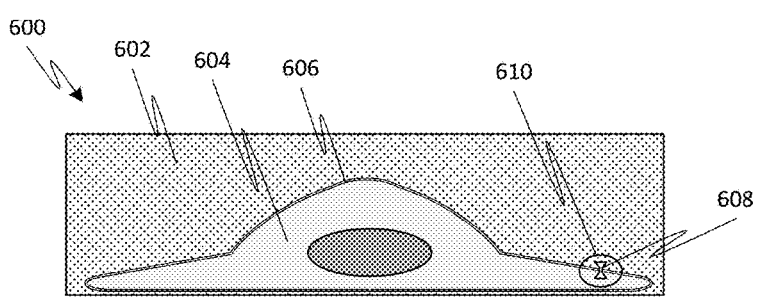
FIG. 12A illustrates an exemplary cell for interrogation by a Brillouin imaging modality, according to one or more embodiments of the disclosed subject matter.
Figure 12B:
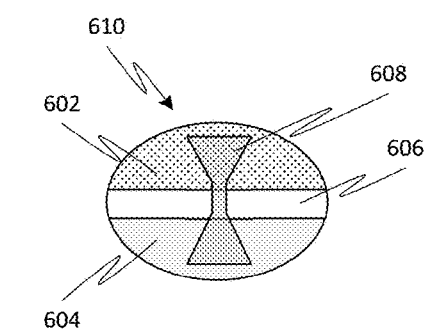
FIG. 12B illustrates a magnified view of region 610 of FIG. 12A.

FIGS. 12A-12B illustrates application of the unmixing principles of the disclosed subject matter to a Brillouin interrogation setup 600 of a cell (e.g., a cell attached to the bottom of a sample holder, such as a Petri dish). For example, in cellular biomechanics, the cell cortex 606, which is a thin (i.e., less than 200 nm) cytoskeletal network that lies directly on the inner face of the plasma membrane, is an actin-rich network that regulates cell morphology and activities by controlling cellular mechanical properties. Due to diffraction limitations, the axial resolution of the Brillouin microscopy may be greater than the thickness of the cortex 606, e.g., ≥500 nm. Thus, the Brillouin signal of the cortex region is the superposition of the Brillouin signature of all the materials within the voxel 608 of the focused beam spot, including cortex 606 itself, surrounding medium 602 and the cytoplasm 604. In a region 610 near the edge of the cell, the superposition of materials can be result in substantial artefacts in the measured Brillouin signatures. Using the techniques of FIG. 10, the Brillouin signatures of the surrounding medium 602 and the cytoplasm 604 can be isolated and then removed from the total Brillouin signature corresponding to voxel 608, thereby providing an accurate Brillouin signature for the cortex 606.

Figure 14A:
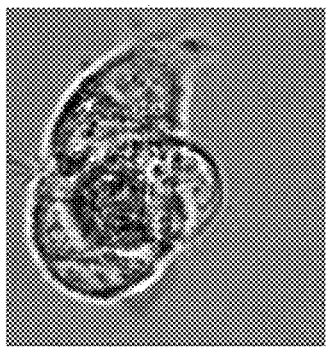
FIG. 14A is a bright-field image of a National Institutes of Health (NIH) 3T3 cell stained with fluorescent dye.
Figure 14B:
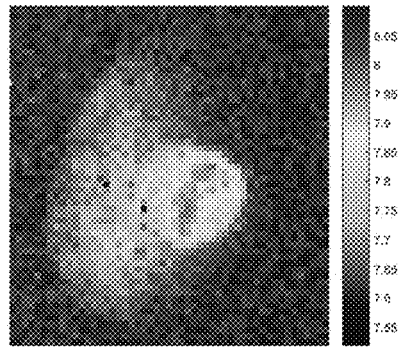
FIG. 14B is a corresponding, original Brillouin image of the 3T3 cell of FIG. 14A.

FIGS. 14A-14D show results of an exemplary experiment for unmixing of Brillouin signatures in the voxel by following the method of FIG. 10. In the experiment, a NIH 3T3 cell (as shown in the bright-field image of FIG. 14A) stained with a fluorescent dye was placed on the sample stage and measured with the microscope setup of FIG. 5A. FIG. 14B shows the original Brillouin image using the mixed Brillouin signal. The edge of the cell is difficult to discern from the surrounding medium due to the artefacts caused by heterogeneous material composition of the Brillouin voxels.

Figure 14C:
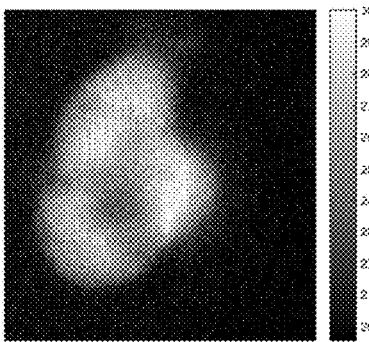
FIG. 14C is a co-registered fluorescent confocal image of the 3T3 cell of FIG. 14A.
Figure 14D:
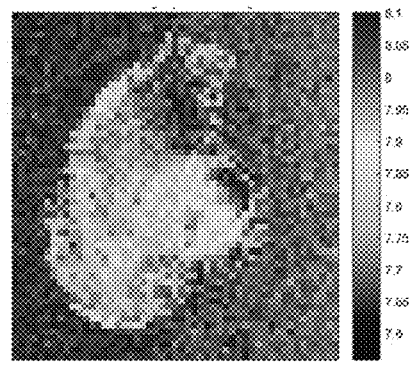
FIG. 14D is the Brillouin image of the 3T3 cell of FIG. 14A after unmixing, according to one or more embodiments of the disclosed subject matter.

FIG. 14C shows the co-registered fluorescent confocal image of the cell, where the fluorescent intensity was normalized within a range from 0 to 1 after subtracting background noise. The volume ratio of the surrounding medium within each pixel was directly determined by the normalized fluorescent intensity therein. With the Brillouin signature and the volume ratio within each voxel, the Brillouin signal of the surrounding medium was determined and subtracted from the mixed Brillouin signal of FIG. 14B, thereby resulting in the unmixed Brillouin image of FIG. 14D. By comparing FIG. 14D with FIG. 14B, it can be seen that the Brillouin shift at the edge of the cell in FIG. 14D is larger than both the surrounding medium and part of the cytoplasm. Since the cell cortex is composed of an actin-rich network that is stiffer than cytoplasm, the Brillouin shift at the cell edge in FIG. 14D is expected. Besides fluorescent confocal microscopy, other techniques (such as, but not limited to, Raman microscopy and Fourier-transform infrared spectrometry) can provide additional information regarding the materials in the voxel, which information could also be used to unmix the Brillouin signal in a similar fashion.

The techniques of Brillouin spectral unmixing discussed herein can be extended to many different scenarios where Brillouin measurements otherwise fail to correlate with mechanical properties due to inhomogeneity in the examined sample. For example, information from the auxiliary imaging modality can be used to eliminate measurement artefacts of highly hydrated biological materials that present large components of "free water." Within biological materials, the interaction of water with polymer chains, collagen fibrils, or other solid network components can be roughly divided in two regimes: (1) part of the water adsorbed in hydrophilic materials is strongly bound to individual sites (i.e., bound water), or (2) an amount of water is bound less firmly or even freely to the polymeric chain (i.e., free water). For Brillouin measurements of soft matter containing both bound water and free water, the signal from free water in the voxel may be considered an artefact. In particular, while bound water will soften the material (and thus maintain the ability of the Brillouin modality to provide information of the mechanical modulus of the material), free water will not contribute much to the mechanical modulus yet strongly influence Brillouin measurements.

Thus, in embodiments, the unmixing techniques disclosed herein can be applied to such samples to obtain an artefact-free (or at least more accurate) Brillouin result. For example, the auxiliary imaging modality may be one of Raman spectroscopy, near-infrared reflectance spectroscopy, or Fourier-transform infrared spectroscopy and can be used to provide information about the amount of free water within the voxels. Using the determined amount of free water, the Brillouin signature of free water can be removed from the total Brillouin signature to yield a more accurate measurement of the material.

In another example, Brillouin measurements may contain artefacts when the sample is not uniformly based on aqueous solutions, e.g., due to the presence of lipids in the sample. For example, a sample may contain white adipose tissue (WAT), which is a loose connective tissue with a central role of storing energy and of which lipids are a main component. Adipose tissue is expected to be among the softest tissues in the body. However, because lipids have an intrinsically higher shift signature, conventional Brillouin measurements of adipose tissue indicate a higher shift than in tissues that are mostly composed of water. Without knowledge of the constituent materials within the measured Brillouin voxel, the Brillouin measurement would not accurately reflect the mechanical properties of the adipose tissue. The unmixing techniques disclosed herein can be applied to lipid-containing samples to obtain artefact-free information by combining Brillouin and auxiliary imaging modalities. For example, the auxiliary imaging modality may include Raman spectroscopy, which can provide extra information of the constituents in the voxel and quantify amounts of lipid versus water present. Such techniques may be especially useful, for example, when characterizing the mechanical patterns of a developing embryo, where different organs may have lipids existing in different manners.

Returning to FIG. 6, the user interface 116 may also include a command icon 362 that instructs independent imaging of the sample via the auxiliary imaging modality. For example, such imaging may be desired when initially viewing a sample, e.g., to locate a particular region of the sample where further investigation is desirable, either by further auxiliary imaging (e.g., magnified imaging) or Brillouin imaging. Of course, other configurations for the user interface 116 are also possible according to one or more contemplated embodiments. Indeed, in some embodiments, the control unit 112 may automatically perform the functions (or portions thereof) underlying the respective command icons 352-362 without selection by a user.

Although much of the discussion above mentions "imaging," the production of an actual image is not strictly necessary. Indeed, the mentions of "imaging" are intended to include the acquisition of data via the Brillouin and/or auxiliary imaging modalities where an image may not be produced. For example, the Brillouin modality may produce graphical results of the Brillouin signatures, or produce values (or a graphical display of values) corresponding to the measured physical properties of the sample. Similarly, the auxiliary imaging modality may produce data or other information used in the processing of the Brillouin data without an actual image being produced. For example, when the auxiliary imaging modality is used for unmixing, the data acquired by the auxiliary imaging modality may be used to determine the appropriate volume ratios without an actual auxiliary image being produced. Accordingly, the use of the term "imaging" herein is intended to include such scenarios and should not be understood as limiting.

Although particular optical components and configuration have been illustrated in the figures and discussed in detail herein, embodiments of the disclosed subject matter are not limited thereto. Indeed, one of ordinary skill in the art will readily appreciate that different optical components or configurations can be selected and/or optical components added to provide the same effect. In practical implementations, embodiments may include additional optical components or other variations beyond those illustrated, for example, additional reflecting elements to manipulate the beam path to fit a particular microscope geometry. Accordingly, embodiments of the disclosed subject matter are not limited to the particular optical configurations specifically illustrated and described herein.

In one or more first embodiments, a system comprises a microscope and a control unit. The microscope can have a first imaging modality and a Brillouin imaging modality. The control unit can be operatively coupled to the first imaging and the Brillouin imaging modalities and can be configured to generate at least a spatially-resolved Brillouin measurement of a sample. An acquisition speed of the first imaging modality can be different from (e.g., faster than) that of the Brillouin imaging modality.

In the first embodiments or any other embodiment, the first imaging modality comprises reflectance imaging, brightfield imaging, fluorescence imaging, multi-photon imaging, phase contrast imaging, or differential interference imaging.

In the first embodiments or any other embodiment, the acquisition speed of the first imaging modality is at least an order of magnitude faster than that of the Brillouin imaging modality.

In the first embodiments or any other embodiment, the control unit is configured to generate the spatially-resolved Brillouin measurement based on information generated by the first imaging modality. In the first embodiments or any other embodiment, the control unit is configured to unmix Brillouin signatures of different materials within a voxel of an interrogating beam of the Brillouin imaging modality based on the information generated by the first imaging modality. In the first embodiments or any other embodiment, the information generated by the first imaging modality comprises volume ratios for the different materials within said voxel. In the first embodiments or any other embodiment, the voxel includes at least first and second different materials, and the control unit controls the Brillouin imaging modality to acquire a first signature of the first material separate from the second material. In the first embodiments or any other embodiment, the control unit controls the first imaging modality to image the voxel and to determine the volume ratio of the first and second materials, and the control unit subtracts the first signature from a signature of the voxel based on the determined volume ratio, so as to determine a second signature for the second material. In the first embodiments or any other embodiment, the voxel has at least one sub-micron dimension.

In the first embodiments or any other embodiment, the control unit is configured to select, or allow selection by a user, of a region of interest imaged by the first imaging modality for interrogation by the Brillouin imaging modality. In the first embodiments or any other embodiment, the selected region of interest comprises a point, a contour, a two-dimensional area, or a three-dimensional volume.

In the first embodiments or any other embodiment, the Brillouin imaging modality and the first imaging modality are constructed to operate simultaneously, so as to acquire data for the spatially-resolved Brillouin measurement together with data for an image by the first imaging modality. In the first embodiments or any other embodiment, the Brillouin imaging modality and the first imaging modality are constructed to operate sequentially.

In the first embodiments or any other embodiment, the Brillouin imaging modality is constructed as a self-contained module that is assembled to an existing setup of the microscope and the first imaging modality.

In the first embodiments or any other embodiment, the Brillouin imaging modality has a first light source generating light of a first wavelength, the first imaging modality has a second light source generating light of a second wavelength, and the first wavelength is different from the second wavelength. In the first embodiments or any other embodiment, the first and second wavelengths differ from each other by at least 5 nanometers. In the first embodiments or any other embodiment, the light of the second wavelength incident on the sample causes emission of light of a third wavelength, and the first wavelength is different than the third wavelength. In the first embodiments or any other embodiment, the first and third wavelengths differ from each other by at least 10 nanometers.

In the first embodiments or any other embodiment, the Brillouin imaging modality includes a selectable calibration module with at least one standard sample. In the first embodiments or any other embodiment, the control unit is configured to control the Brillouin imaging modality to periodically interrogate the at least one standard sample to measure a Brillouin frequency shift, and to compensate for at least one of frequency drift of a light source of the Brillouin imaging modality or mechanical drift of components of the Brillouin imaging modality based on the measured Brillouin frequency shift. In the first embodiments or any other embodiment, the control unit is configured to compensate by correcting at least one of free spectral range and pixel-to-frequency conversion ratio based on the measured Brillouin frequency shift.

In the first embodiments or any other embodiment, the Brillouin imaging modality includes a linear polarizer and a polarized beam splitter, and the control unit is configured to control the linear polarizer such that in a first orientation, light from the light source is reflected by the polarized beam splitter toward an objective of the microscope to interrogate the sample, and in a second orientation, light from the light source is transmitted through the polarized beam splitter toward a focusing lens to interrogate the at least one standard sample.

In the first embodiments or any other embodiment, the Brillouin imaging modality includes a Brillouin spectrometer. In the first embodiments or any other embodiment, the Brillouin spectrometer includes a pair of apodized cross-axis virtually imaged phase array (VIPA) etalons.

In the first embodiments or any other embodiment, the Brillouin imaging modality includes a narrowband filter constructed to prevent light having a wavelength of a light source of the first imaging modality from entering the Brillouin spectrometer.

In the first embodiments or any other embodiment, the first imaging modality is a confocal imaging modality and includes a pair of pinhole apertures for input light and detected light, respectively.

In the first embodiments or any other embodiment, a dichroic mirror is disposed along an optical path to an objective lens of the microscope and is constructed to direct interrogating light from the first imaging modality and the Brillouin imaging modality to the objective lens, and to respectively direct light from the sample to the first imaging modality and the Brillouin imaging modality. In the first embodiments or any other embodiment, the dichroic mirror is constructed to transmit substantially all light at a wavelength of a light source of the Brillouin imaging modality and to reflect substantially all light at a wavelength of a light source of the first imaging modality. In the first embodiments or any other embodiment, the dichroic mirror is further constructed to transmit substantially all light at a Brillouin-shifted wavelength from the sample and to reflect substantially all light at a wavelength of emitted light from the sample.

In the first embodiments or any other embodiment, a movable mirror is constructed such that in a first position of the movable mirror, interrogating light from the first imaging modality is directed to an objective les of the microscope, interrogating light from the Brillouin imaging modality is not directed to the objective lens, and light from the sample is directed to the first imaging modality, and in a second position of the movable mirror, the interrogating light from the Brillouin imaging modality is directed to the objective lens, the interrogating light from the first imaging modality is not directed to the objective lens, and light from the sample is directed to the Brillouin imaging modality. In the first embodiments or any other embodiment, the control unit is configured to control positioning of the movable mirror.

In the first embodiments or any other embodiment, respective imaging regions in the sample for the first imaging modality and the Brillouin imaging modality are co-registered.

In the first embodiments or any other embodiment, the system further comprises a display that displays an image representing the spatially-resolved Brillouin measurement of the sample in substantially real-time. In the first embodiments or any other embodiment, the system further comprises an interface configured to allow external communication with and/or control of the control unit.

In one or more second embodiment, as method comprises directing first interrogating light from a first imaging modality to a sample and detecting first light from the sample using the first imaging modality, directing second interrogating light from a Brillouin imaging modality to the sample and detecting second light from the sample using the Brillouin imaging modality, and generating a spatially-resolved Brillouin measurement of the sample based on the detected second light. An acquisition speed of the first imaging modality can be different than that of the Brillouin imaging modality.

In the second embodiments or any other embodiment, the acquisition speed of the first imaging modality is faster than that of the Brillouin imaging modality. In the second embodiments or any other embodiment, the acquisition speed of the first imaging modality is at least an order of magnitude faster than that of the Brillouin imaging modality.

In the second embodiments or any other embodiment, the first imaging modality comprises at least one of reflectance imaging, brightfield imaging, fluorescence imaging, multiphoton imaging, phase contrast imaging, differential interference imaging, near-infrared reflectance spectroscopy, Fourier-transform infrared (FTIR) spectroscopy, spontaneous Raman spectroscopy, stimulated Raman spectroscopy, stimulated Brillouin spectroscopy, and frequency comb spectroscopy.

In the second embodiments or any other embodiment, the spatially-resolved Brillouin measurement is generated based on information generated by the first imaging modality. In the second embodiments or any other embodiment, the generating the spatially-resolved Brillouin measurement comprises unmixing Brillouin signatures of different materials within a sample voxel of the second interrogating light based on the information from the first imaging modality. In the second embodiments or any other embodiment, the information from the first imaging modality comprises a volume ratio of the different materials within said sample voxel. In the second embodiments or any other embodiment, the sample voxel includes at least first and second materials. In the second embodiments or any other embodiment, the unmixing comprises acquiring a first signature of the first material separate from the second material using the Brillouin imaging modality, imaging the sample voxel using the first imaging modality, based on the image of the sample voxel determining a volume ratio of the first and second materials, and subtracting the first signature from a signature of the sample voxel based on the determined volume ratio so as to determine a second signature for the second material. In the second embodiments or any other embodiment, the sample voxel has at least one sub-micron dimension.

In the second embodiments or any other embodiment, a first image is generated based on the detected first light. In the second embodiments or any other embodiment, the method further comprises selecting a region of interest in the first image for interrogation by the Brillouin imaging modality. In the second embodiments or any other embodiment, the second interrogating light is confined to the selected region of interest in generating the spatially-resolved Brillouin measurement. In the second embodiments or any other embodiment, the selected region of interest comprises a point, a contour, a two-dimensional area, or a three-dimensional volume.

In the second embodiments or any other embodiment, the directing first interrogating light to the sample and the directing second interrogating light to the sample occur simultaneously. In the second embodiments or any other embodiment, the directing first interrogating light to the sample occurs before or after the directing second interrogating light to the sample.

In the second embodiments or any other embodiment, the first imaging modality and the Brillouin imaging modality are mounted on a common microscope. In the second embodiments or any other embodiment, the Brillouin imaging modality is constructed as a self-contained module, and the method further comprises, prior to the directing second interrogating light, assembling the self-contained module to an existing setup of the microscope and the first imaging modality.

In the second embodiments or any other embodiment, the first interrogating light has a wavelength different than that of the second interrogating light. In the second embodiments or any other embodiment, the wavelengths of the first interrogating light and the second interrogating light differ by at least 5 nanometers.

In the second embodiments or any other embodiment, the method further comprises periodically redirecting the second interrogating light to a calibration stage of the Brillouin imaging modality. In the second embodiments or any other embodiment, the calibration stage including at least one standard sample. In the second embodiments or any other embodiment, the method further comprises detecting third light from the at least one standard sample to measure a Brillouin frequency shift, and compensating for at least one of frequency drift of a light source of the Brillouin imaging modality or mechanical drift of components of the Brillouin imaging modality based on a comparison of the measured Brillouin frequency shift with an expected Brillouin frequency shift for the at least one standard sample. In the second embodiments or any other embodiment, the compensating includes correcting at least one of free spectral range and pixel-to-frequency conversion ratio based on the comparison.

In the second embodiments or any other embodiment, the Brillouin imaging module includes a Brillouin spectrometer for detecting the second light, and the method further comprises preventing the first interrogating light and/or the first light from reaching the Brillouin spectrometer.

In the second embodiments or any other embodiment, the directing first interrogating light and the directing second interrogating light are such that the first interrogating light and the second interrogating light are directed along a common optical path to the sample via an objective lens of a microscope. In the second embodiments or any other embodiment, the directing first interrogating light and the directing second interrogating light are such that the first interrogating light is directed along a first path to the sample via a first objective lens while the second interrogating light is directed along a second path to the sample via a second objective lens, and the first and second paths are spatially co-registered.

In the second embodiments or any other embodiment, the method further comprises moving at least one of the sample, the Brillouin imaging modality, and the first imaging modality with respect to each other, in order to interrogate a different portion of the sample. In the second embodiments or any other embodiment, the method further comprises moving at least one of the first and second interrogating lights in order to interrogate a different portion of the sample.

In the second embodiments or any other embodiment, the method further comprises displaying an image representative of the generated spatially-resolved Brillouin measurement in real-time or substantially in real-time.

In the second embodiments or any other embodiment, the sample comprises a biological sample. In the second embodiments or any other embodiment, the sample comprises a biological cell or cells. In the second embodiments or any other embodiment, the sample is heterogeneous with respect to at least material composition on a submicron scale.

In one or more third embodiments, a kit for modification of an existing microscope comprises a Brillouin imaging modality having an acquisition speed that is different from (e.g., less than) that of a first imaging modality of the microscope. In the third embodiments or any other embodiment, the Brillouin imaging modality comprises a Brillouin spectrometer configured to detect light from a sample, a first light source configured to generate interrogating light having a first wavelength different from a second wavelength of a second light source of the first imaging modality, and a filter configured to prevent light having the second wavelength from reaching the Brillouin spectrometer.

In the third embodiments or any other embodiment, the Brillouin imaging modality further includes a selectable calibration station including at least one standard sample with known Brillouin signature. In the third embodiments or any other embodiment, the Brillouin imaging modality includes a linear polarizer and polarized beam splitter constructed to allow selection between interrogating the sample and interrogating the at least one standard sample of the calibration station.

In the third embodiments or any other embodiment, the Brillouin spectrometer includes a pair of apodized cross-axis virtually imaged phase array (VIPA) etalons.

In the third embodiments or any other embodiment, the kit further comprises a coupling component that combines the interrogating light from the first light source and interrogating light from the second light source along a common optical path, and that redirects light from the sample to a corresponding one of the Brillouin and first imaging modalities. In the third embodiments or any other embodiment, the coupling component is a dichroic mirror that transmits substantially all light at one of the first and second wavelengths and reflects substantially all light at the other of the first and second wavelengths. In the third embodiments or any other embodiment, the coupling component comprises a movable mirror that can be displaced between positions to serially select between interrogation by the Brillouin imaging modality and the first imaging modality.

In one or more fourth embodiments, a microscope system comprises a microscope with an objective lens and a first imaging modality, and a kit according to any one of the third embodiments.

In the fourth embodiments or any other embodiment, the microscope is constructed as a confocal microscope.

In one or more fifth embodiments, a system comprises a microscope and a control unit. The microscope can have a spectroscopic modality and a Brillouin imaging modality. The control unit can be operatively coupled to the spectroscopic and the Brillouin imaging modalities and configured to generate at least a spatially-resolved Brillouin measurement of a sample. The spectroscopic modality can include at least one of near-infrared reflectance spectroscopy, Fourier-transform infrared (FTIR) spectroscopy, spontaneous Raman spectroscopy, stimulated Raman spectroscopy, stimulated Brillouin spectroscopy, and frequency comb spectroscopy.

In the fifth embodiments or any other embodiment, the control unit is configured to generate the spatially-resolved Brillouin measurement based on information generated by the spectroscopic modality. In the fifth embodiments or any other embodiment, the control unit is configured to unmix Brillouin signatures of different materials within a voxel of an interrogating beam of the Brillouin imaging modality based on information generated by the spectroscopic modality. In the fifth embodiments or any other embodiment, the information generated by the spectroscopic modality comprises volume ratios for the different materials within said voxel.

In the fifth embodiments or any other embodiment, the voxel includes at least first and second different materials, and the control unit controls the Brillouin imaging modality to acquire a first signature of the first material separate from the second material. In the fifth embodiments or any other embodiment, the control unit controls the spectroscopic modality to image the voxel and to determine the volume ratio of the first and second materials, and the control unit subtracts the first signature from a signature of the voxel based on the determined volume ratio, so as to determine a second signature for the second material. In the fifth embodiments or any other embodiment, the voxel has at least one sub-micron dimension.

In the fifth embodiments or any other embodiment, the control unit is configured to select, or allow selection by a user, of a region of interest imaged by the spectroscopic modality for interrogation by the Brillouin imaging modality. In the fifth embodiments or any other embodiment, the selected region of interest comprises a point, a contour, a two-dimensional area, or a three-dimensional volume.

In the fifth embodiments or any other embodiment, the Brillouin imaging modality and the spectroscopic modality are constructed to operate simultaneously, so as to acquire data for the spatially-resolved Brillouin measurement together with data for an image by the spectroscopic modality. In the fifth embodiments or any other embodiment, the Brillouin imaging modality and the spectroscopic modality are constructed to operate sequentially.

In the fifth embodiments or any other embodiment, the Brillouin imaging modality has a first light source generating light of a first wavelength, the spectroscopic modality has a second light source generating light of a second wavelength, and the first wavelength is different from the second wavelength by at least 5 nanometers.

It will be appreciated that the aspects of the disclosed subject matter, for example, the control system 112 and/or the user interface 116, can be implemented, fully or partially, in hardware, hardware programmed by software, software instruction stored on a computer readable medium (e.g., a non-transitory computer readable medium), or any combination of the above.

For example, components of the disclosed subject matter, including components such as a control unit, controller, processor, user interface, or any other feature, can include, but are not limited to, a personal computer or workstation or other such computing system that includes a processor, microprocessor, microcontroller device, or is comprised of control logic including integrated circuits such as, for example, an application specific integrated circuit (ASIC).

Features discussed herein can be performed on a single or distributed processor (single and/or multi-core), by components distributed across multiple computers or systems, or by components co-located in a single processor or system. For example, aspects of the disclosed subject matter can be implemented via a programmed general purpose computer, an integrated circuit device, (e.g., ASIC), a digital signal processor (DSP), an electronic device programmed with microcode (e.g., a microprocessor or microcontroller), a hard-wired electronic or logic circuit, a programmable logic circuit (e.g., programmable logic device (PLD), programmable logic array (PLA), field-programmable gate array (FPGA), programmable array logic (PAL)), software stored on a computer-readable medium or signal, an optical computing device, a networked system of electronic and/or optical devices, a special purpose computing device, a semiconductor chip, a software module or object stored on a computer-readable medium or signal.

When implemented in software, functions may be stored on or transmitted over as one or more instructions or code on a computer-readable medium. The steps of a method or algorithm disclosed herein may be embodied in a processor-executable software module, which may reside on a computer-readable medium. Instructions can be compiled from source code instructions provided in accordance with a programming language. The sequence of programmed instructions and data associated therewith can be stored in a computer-readable medium (e.g., a non-transitory computer readable medium), such as a computer memory or storage device, which can be any suitable memory apparatus, such as, but not limited to read-only memory (ROM), programmable read-only memory (PROM), electrically erasable programmable read-only memory (EEPROM), random-access memory (RAM), flash memory, disk drive, etc.

As used herein, computer-readable media includes both computer storage media and communication media, including any medium that facilitates the transfer of a computer program from one place to another. Thus, a storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a transmission medium (e.g., coaxial cable, fiber optic cable, twisted pair, digital subscriber line (DSL), or wireless technologies such as infrared, radio, and microwave), then the transmission medium is included in the definition of computer-readable medium. Moreover, the operations of a method or algorithm may reside as one of (or any combination of) or a set of codes and/or instructions on a machine-readable medium and/or computer-readable medium, which may be incorporated into a computer program product.

One of ordinary skill in the art will readily appreciate that the above description is not exhaustive, and that aspects of the disclosed subject matter may be implemented other than as specifically disclosed above. Indeed, embodiments of the disclosed subject matter can be implemented in hardware and/or software using any known or later developed systems, structures, devices, and/or software by those of ordinary skill in the applicable art from the functional description provided herein.

In this application, unless specifically stated otherwise, the use of the singular includes the plural, and the separate use of "or" and "and" includes the other, i.e., "and/or." Furthermore, use of the terms "including" or "having," as well as other forms such as "includes," "included," "has," or "had," are intended to have the same effect as "comprising" and thus should not be understood as limiting.

Any range described herein will be understood to include the endpoints and all values between the endpoints. Whenever "substantially," "approximately," "essentially," "near," or similar language is used in combination with a specific value, variations up to and including 10% of that value are intended, unless explicitly stated otherwise.

It is thus apparent that there is provided, in accordance with the present disclosure, Brillouin imaging devices and systems and methods employing such devices. Many alternatives, modifications, and variations are enabled by the present disclosure. While specific examples have been shown and described in detail to illustrate the application of the principles of the present invention, it will be understood that the invention may be embodied otherwise without departing from such principles. For example, disclosed features may be combined, rearranged, omitted, etc. to produce additional embodiments, while certain disclosed features may sometimes be used to advantage without a corresponding use of other features. Accordingly, Applicant intends to embrace all such alternative, modifications, equivalents, and variations that are within the spirit and scope of the present invention.

The invention claimed is:

1. A system comprising:
   a microscope having a spectroscopic modality and a Brillouin imaging modality; and
   a control unit operatively coupled to the spectroscopic and the Brillouin imaging modalities and configured to generate at least a spatially-resolved Brillouin measurement of a sample,
   wherein the spectroscopic modality comprises near-infrared reflectance spectroscopy, Fourier-transform infrared (FTIR) spectroscopy, spontaneous Raman spectroscopy, stimulated Raman spectroscopy, stimulated Brillouin spectroscopy, or frequency comb spectroscopy, and
   the control unit is configured to generate the spatially-resolved Brillouin measurement based on information generated by the spectroscopic modality and the Brillouin imaging modality.

2. The system of claim 1, wherein the control unit is configured to unmix Brillouin signatures of different materials within a voxel of an interrogating beam of the Brillouin imaging modality based on the information generated by the spectroscopic modality.

3. The system of claim 2, wherein the information generated by the spectroscopic modality comprises volume ratios for the different materials within said voxel.

4. The system of claim 3, wherein:
   the voxel includes at least first and second different materials,
   the control unit controls the Brillouin imaging modality to acquire a first signature of the first material separate from the second material,
   the control unit controls the spectroscopic modality to image the voxel and to determine the volume ratio of the first and second materials, and
   the control unit subtracts the first signature from a signature of the voxel based on the determined volume ratio, so as to determine a second signature for the second material.

5. The system of claim 2, wherein the voxel has at least one sub-micron dimension.

6. The system of claim 1, wherein the control unit is configured to select, or allow selection by a user, of a region of interest imaged by the spectroscopic modality for interrogation by the Brillouin imaging modality.

7. The system of claim 6, wherein the selected region of interest comprises a point, a contour, a two-dimensional area, or a three-dimensional volume.

8. The system of claim 1, wherein the Brillouin imaging modality and the spectroscopic modality are constructed to operate simultaneously, so as to acquire data for the spatially-resolved Brillouin measurement together with data for an image by the spectroscopic modality.

9. The system of claim 1, wherein the Brillouin imaging modality and the spectroscopic modality are constructed to operate sequentially.

10. The system of claim 1, wherein the Brillouin imaging modality has a first light source generating light of a first wavelength, the spectroscopic modality has a second light source generating light of a second wavelength, and the first wavelength is different from the second wavelength by at least 5 nanometers.

11. The system of claim 1, wherein the Brillouin imaging modality comprises a Brillouin spectrometer having (i) a pair of apodized cross-axis virtually imaged phase array (VIPA) etalons, (ii) a narrowband filter constructed to prevent light having a wavelength of a light source of the spectroscopic modality from entering the Brillouin spectrometer, or both (i) and (ii).

12. The system of claim 1, wherein:
(a) an acquisition speed of the spectroscopic modality is faster than that of the Brillouin imaging modality;
(b) a resolution of the spectroscopic modality is smaller than that of the Brillouin imaging modality; or
(c) both (a) and (b).

13. A system comprising:
a microscope having a spectroscopic modality and a Brillouin imaging modality; and
a control unit operatively coupled to the spectroscopic and the Brillouin imaging modalities and configured to generate at least a spatially-resolved Brillouin measurement of a sample, wherein:
the spectroscopic modality comprises near-infrared reflectance spectroscopy, Fourier-transform infrared (FTIR) spectroscopy, spontaneous Raman spectroscopy, stimulated Raman spectroscopy, stimulated Brillouin spectroscopy, or frequency comb spectroscopy;
the Brillouin imaging modality includes a linear polarizer, a polarizing beam splitter, and a selectable calibration module with at least one standard sample; and
the control unit is configured to:
control the Brillouin imaging modality to periodically interrogate the at least one standard sample to measure a Brillouin frequency shift, and
compensate for at least one of frequency drift of a light source of the Brillouin imaging modality or mechanical drift of components of the Brillouin imaging modality by correcting at least one of free spectral range and pixel-to-frequency conversion ratio based on the measured Brillouin frequency shift; and
the control unit is further configured to control the linear polarizer such that:
in a first orientation, light from the light source is reflected by the polarizing beam splitter toward an objective of the microscope to interrogate the sample, and
in a second orientation, light from the light source is transmitted through the polarizing beam splitter toward a focusing lens to interrogate the at least one standard sample.

14. A method comprising:
directing first interrogating light from a spectroscopic modality to a sample and detecting first light from the sample using the spectroscopic modality;
directing second interrogating light from a Brillouin imaging modality to the sample and detecting second light from the sample using the Brillouin imaging modality; and
generating a spatially resolved Brillouin measurement of the sample based on the detected first light and the detected second light,
wherein the spectroscopic modality comprises near-infrared reflectance spectroscopy, Fourier-transform infrared (FTIR) spectroscopy, spontaneous Raman spectroscopy, stimulated Raman spectroscopy, stimulated Brillouin spectroscopy, or frequency comb spectroscopy.

15. The method of claim 14, wherein the generating the spatially resolved Brillouin measurement comprises unmixing Brillouin signatures of different materials within a sample voxel of the second interrogating light based on the detected first light.

16. The method of claim 15, wherein the sample voxel has at least one sub-micron dimension.

17. The method of claim 14, wherein the Brillouin imaging modality comprises a Brillouin spectrometer having (i) a pair of apodized cross-axis virtually imaged phase array (VIPA) etalons, (ii) a narrowband filter constructed to prevent light having a wavelength of a light source of the spectroscopic modality from entering the Brillouin spectrometer, or both (i) and (ii).

18. The method of claim 14, wherein:
the Brillouin imaging modality comprises a linear polarizer, a polarizing beam splitter, and a selectable calibration module with at least one standard sample, the linear polarizer having a first orientation and a second orientation,
in the first orientation, the linear polarizer causes light from a light source of the Brillouin imaging modality to be reflected by the polarizing beam splitter toward the sample,
in the second orientation, the linear polarizer causes light from the light source of the Brillouin imaging modality to be transmitted through the polarizing beam splitter toward the at least one standard sample, and
the method further comprises:
periodically redirecting the second interrogating light to the at least one standard sample by changing the linear polarizer from the first orientation to the second orientation;
detecting third light from the at least one standard sample to measure a Brillouin frequency shift; and
compensating for at least one of frequency drift of a light source of the Brillouin imaging modality or mechanical drift of components of the Brillouin imaging modality based on a comparison of the measured Brillouin frequency shift with an expected Brillouin frequency shift for the at least one standard sample.

19. The method of claim 14, wherein:
(a) an acquisition speed of the spectroscopic modality is faster than that of the Brillouin imaging modality;

(b) a resolution of the spectroscopic modality is smaller than that of the Brillouin imaging modality; or
(c) both (a) and (b).

\* \* \* \* \*